US 12,072,028 B2

(12) United States Patent
Wang et al.

(10) Patent No.: US 12,072,028 B2
(45) Date of Patent: Aug. 27, 2024

(54) CONTROL VALVE AND CONTROL VALVE SYSTEM

(71) Applicant: ZHEJIANG SANHUA AUTOMOTIVE COMPONENTS CO., LTD., Zhejiang (CN)

(72) Inventors: Lixin Wang, Zhejiang (CN); Junqing Tu, Zhejiang (CN); Zhibiao Yu, Zhejiang (CN); Weidong Pan, Zhejiang (CN)

(73) Assignee: ZHEJIANG SANHUA AUTOMOTIVE COMPONENTS CO., LTD., Zhejiang (CN)

( * ) Notice: Subject to any disclaimer, the term of this patent is extended or adjusted under 35 U.S.C. 154(b) by 55 days.

(21) Appl. No.: 18/014,155

(22) PCT Filed: Nov. 19, 2021

(86) PCT No.: PCT/CN2021/131707
§ 371 (c)(1),
(2) Date: Dec. 31, 2022

(87) PCT Pub. No.: WO2022/105864
PCT Pub. Date: May 27, 2022

(65) Prior Publication Data
US 2023/0258271 A1  Aug. 17, 2023

(30) Foreign Application Priority Data

Nov. 20, 2020  (CN) .......................... 202011307118.0
Dec. 31, 2020  (CN) .......................... 202011627412.X

(51) Int. Cl.
F16K 11/16   (2006.01)
F16K 31/53   (2006.01)

(52) U.S. Cl.
CPC .......... *F16K 11/165* (2013.01); *F16K 31/535* (2013.01)

(58) Field of Classification Search
CPC ............................. F16K 11/165; F16K 31/535
See application file for complete search history.

(56) References Cited

U.S. PATENT DOCUMENTS

2015/0027575 A1*  1/2015  Morein ................. F16K 11/165
                                                                    137/865
2016/0003126 A1*  1/2016  Carns ................... F16K 5/0605
                                                                    251/304

(Continued)

FOREIGN PATENT DOCUMENTS

CN   207229832 U   4/2018
CN   110043692 A   7/2019

(Continued)

OTHER PUBLICATIONS

International Search Report for PCT/CN2021/131707 mailed Jan. 28, 2022, ISA/CN.

*Primary Examiner* — Kevin R Barss
(74) *Attorney, Agent, or Firm* — Yue (Robert) Xu; Appex Attorneys at Law, LLP

(57) ABSTRACT

A control valve and a control valve system. The control valve comprises a valve body and valve cores; the valve cores comprise a first valve core and a second valve core; the control valve comprises a valve cavity; the valve body has multiple ports; the first valve core and the second valve core are located in the valve cavity; rotation of the valve cores can open or close ports corresponding to fluid channels of the valve cores. The control valve further comprises a first transmission portion and a second transmission portion, the first transmission portion and the first valve core are integrally formed or in transmission connection, and the second transmission portion and the second valve core are integrally (Continued)

formed or in transmission connection; a valve core shaft and the first valve core are in transmission connection.

20 Claims, 20 Drawing Sheets

(56) References Cited

U.S. PATENT DOCUMENTS

| | | | |
|---|---|---|---|
| 2016/0281585 A1* | 9/2016 | Muizelaar | F16K 11/165 |
| 2018/0094747 A1* | 4/2018 | Dordoni | F16K 31/535 |
| 2019/0309862 A1* | 10/2019 | Yu | F16K 27/048 |
| 2020/0109787 A1* | 4/2020 | Tsuji | F16K 27/067 |
| 2020/0114725 A1* | 4/2020 | Kanzaki | F01P 7/165 |
| 2020/0124204 A1* | 4/2020 | Wawersig | F16K 11/076 |
| 2020/0224779 A1* | 7/2020 | Henker | F16K 11/0876 |
| 2020/0248824 A1* | 8/2020 | Ma | F16K 31/535 |
| 2020/0248836 A1* | 8/2020 | Bugeja | F16K 31/535 |
| 2024/0052936 A1* | 2/2024 | Tiemeyer | F01P 7/165 |
| 2024/0060569 A1* | 2/2024 | Wang | F16K 11/0853 |

FOREIGN PATENT DOCUMENTS

| | | |
|---|---|---|
| CN | 211501747 U | 9/2020 |
| CN | 113251179 A | 8/2021 |
| JP | 2013108551 A | 6/2013 |

* cited by examiner

Mode 1

Mode 3

Mode 4

Mode 5

CONTROL VALVE AND CONTROL VALVE SYSTEM

CROSS REFERENCE OF RELATED APPLICATION

This disclosure is a national phase application of PCT international patent application PCT/CN2021/131707, filed on Nov. 19, 2021 which claims the benefit of priorities to the following two Chinese patent applications, both of which are incorporated herein by reference, 1) Chinese Patent Application No. 202011307118.0, titled "CONTROL VALVE", filed with the China National Intellectual Property Administration on Nov. 20, 2020; and 2) Chinese Patent Application No. 202011627412.X titled "CONTROL VALVE AND CONTROL VALVE SYSTEM", filed with the China National Intellectual Property Administration on Dec. 31, 2020.

FIELD

The present disclosure relates to the technical field of fluid control, and in particular to a control valve and a control valve system.

BACKGROUND

In order to reduce the system space occupied by a control valve and the complexity of the system pipeline connection, the fluid control system usually adopts the combination of multiple valve cores, and a gear meshing mechanism is used to adjust the rotation angles of multiple valve cores, so as to switch the valve core flow passages. However, the structure of gear meshing mechanism is complicated.

SUMMARY

In order to provide a control valve with a simple switched mode of multiple valve core flow passages, the following technical solution are provided according to the present disclosure:

in one aspect, a control valve is provided according to an embodiment of the present disclosure, the control valve includes a valve body, a valve core and a valve core shaft, the control valve has a valve cavity, the valve body is provided with multiple ports, at least part of the valve core is positioned in the valve cavity, the valve core includes a first valve core and a second valve core, the first valve core and the second valve core are arranged along an axial direction of the control valve, at least part of the first valve core and at least part of the second valve core are located in the valve cavity, the port corresponding to a fluid passage of the valve core can be opened or closed by rotating the valve core, the control valve further includes a first transmission part and a second transmission part, the first transmission part and the first valve core are integrally formed or in transmission connection, so that the first transmission part can rotate synchronously with the first valve core, the second transmission part and the second valve core are integrally formed or in transmission connection, so that the second transmission part can rotate synchronously with the second valve core, where the valve core shaft is in transmission connection with the first valve core, the first transmission part is in contact with the second transmission part within a preset angle range and pushes the second valve core to rotate, and in case of being out the present angle range, a gap is formed between the first transmission part and the second transmission part.

In another aspect, a control valve system is further provided according to the embodiment of the present disclosure, the control valve system includes a connecting piece and the above control valve, the control valve is provided with multiple pipe orifices, the connecting piece is provided with a communication cavity, the valve body includes a first valve body and a second valve body, at least part of the first valve core is located in the first valve body, at least part of the second valve core is located in the second valve body;

where part of the pipe orifices located in the first valve body are in communication through the communication cavity of the connecting piece, the connecting piece is at least one of fluid components and a bypass pipeline.

The control valve provided by the present disclosure includes a first transmission part and a second transmission part, the valve core shaft can drive the first valve core to rotate, the first transmission part can rotate synchronously with the first valve core, the second transmission part can rotate synchronously with the second valve core. In case that the rotation angle of the first valve core is within the preset angle range, the first transmission part is in contact with the second transmission part and drives the second valve core to rotate, thus realizing combined connection and cut-off of the flow passage, the assembly structure between the valve cores of the control valve is relatively simple, and a small impact, which can realize various combinations of the first valve core and the second valve core and flow passage switched modes.

DETAILED DESCRIPTION OF THE EMBODIMENTS

Figure 1:
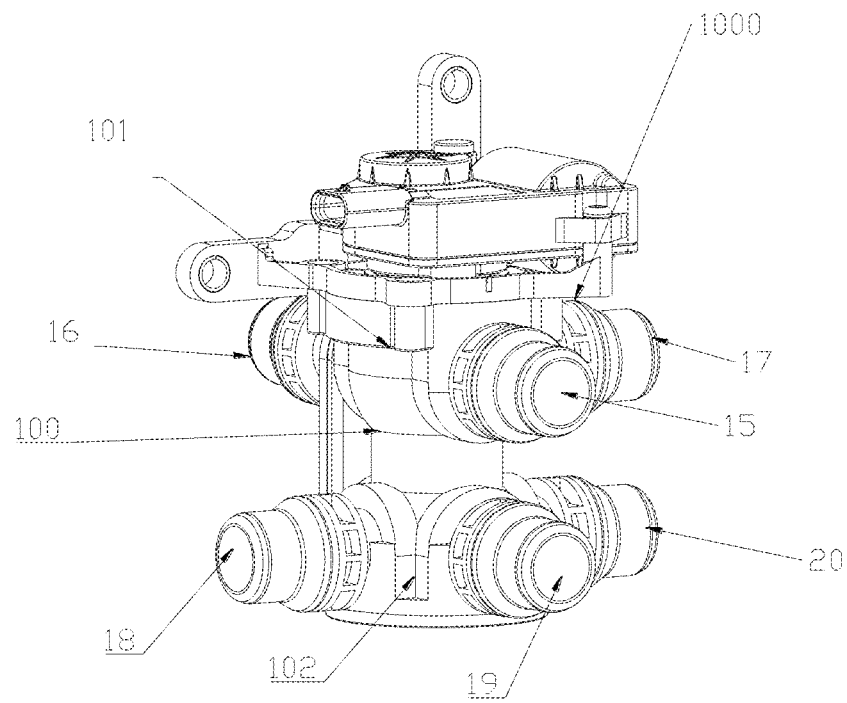
FIG. 1 is a three-dimensional structure diagram of a first embodiment of a control valve provided in the disclosure.

The features and exemplary embodiments of various aspects of the present disclosure are described in detail below. To make the objects, solutions and advantages of the present disclosure more clear and apparent, the present disclosure is described in detail in conjunction with the drawings and the specifically embodiments.

As shown in FIG. 1 to FIG. 3, FIG. 10 and FIG. 11, a control valve 1000 is provided according to an embodiment of the present disclosure, including a valve body 100, a valve core and a valve core shaft 9. The control valve 1000 has a valve cavity and multiple pipe orifices, the valve body 100 has multiple ports opening into the valve cavity, the pipe orifice is connected with the port through the flow passage formed between the pipe orifice and the port, and the pipe orifice is connected with the valve cavity through the port, at least part of the valve core is located in the valve cavity, and the valve core shaft 9 can drive the valve core to rotate, the port corresponding to the fluid passage of the valve core can be opened or closed by rotating the valve core, so that the port can be switched between opening state and closing state. The valve core includes a first valve core 10 and a second valve core 12 arranged in an axial direction of the control valve 1000, at least part of the first valve core 10 and at least part of the second valve core 12 are both located in the valve cavity. The control valve 1000 further includes a first transmission part 45 and a second transmission part 56, the first transmission part 45 and the first valve core 10 are integrally formed or in transmission connection, so that the first transmission part 45 can rotate with the first valve core 10 synchronously, the second transmission part 56 and the second valve core 12 are integrally formed or in transmission connection, so that the second transmission part 56 can rotate with the second valve core 12 synchronously. The valve core shaft 9 is in transmission connection with the first valve core 10, so that the valve core shaft 9 can drive the first valve core 10 to rotate, the first transmission part 45 is in contact with the second transmission part 56 within a preset angle range and pushes the second valve core 12 to rotate, and in case of being out the present angle range, a gap is formed between the first transmission part 45 and the second transmission part 56, and the first transmission part 45 is not in contact with the second transmission part 56 in that case. The transmission connection in this specification refers to the transmission of the driving force can obtained between the first part and the second part, so that the two parts can rotate under the action of driving force, where the two parts can be directly contacted and connected, or can be connected through other transmission structures, such as gears, worm gears, etc. In some embodiments, the orientation of the pipe orifice and the corresponding port is the same, or the orientation of the pipe orifice and the corresponding port intersect, the context herein takes the example that the pipe orifice and the corresponding port have a same orientation to illustrate.

In the embodiment of the present disclosure, by providing the first transmission part 45 and the second transmission part 56, when the valve core shaft 9 drives the first valve core 10 to rotate and the rotation angle of the first valve core 10 is within the preset angle range, the first transmission part 45 is in contact with the second transmission part 56 and drives the second valve core 12 to rotate, thus realizing the combined communication/cut-off of the flow passage, this kind of control valve 1000 has simple assembly structure between the valve cores, a small impact, and can realize various combinations of the first valve core 10 and the second valve core 12 and flow passage switched modes.

In some embodiments, the control valve 1000 further includes a first fastener 1, an upper housing 2, a driving control part 3, a lower housing 4 and an adapter 7, the first fastener 1 is connected to the upper housing 2, the lower housing 4 and the adapter 7, the adapter 7 and the valve body 100 can be fixed by welding and sealed. The adapter 7 can connect the upper housing 2, the driving control part 3, the lower housing 4 and the valve body 100. Further, the connection between the control valve 1000 and other fluid structures can be realized through the adapter 7. The driving control part 3 is fitted between the upper housing 2 and the lower housing 4 by welding methods such as activation welding and ultrasonic wave. In the axial direction of the control valve 1000, the first valve core 10 is located between the driving control part 3 and the second valve core 12, the adapter 7 is connected between the driving control part 3 and the first valve core 10. The driving control part 3 can provide power for the rotation of the valve core shaft 9, and the valve core shaft 9 sequentially extends through the lower housing 4, the adapter 7, the first valve core 10 and the second valve core 12, and the valve core shaft 9 can drive the first valve core 10 and the second valve core 12 to rotate, so as to realize various flow passage switched modes. In some embodiments, the lower housing 4 and the adapter 7 can be integrally formed, which is benefit to reduce the number of parts. For example, the lower housing 4 and the adapter 7 can be integrally injection molded, which is benefit to reduce the axial height of the control valve 1000.

The control valve 1000 further includes an oil seal 5, a second fastener 6, an O-ring 8, multiple sealing pieces 11, a connecting pipe 13 and a cover 14, where the oil seal 5 is assembled on the periphery of the valve core shaft 9, and the second fastener 6 connects the adapter 7 and the valve body 100, the O-ring 8 is located between the adapter 7 and the valve body 100, which can seal between the adapter 7 and the valve body 100. The sealing piece 11 is located between the valve core and the valve body 100, and is mainly configured to seal the connection between the valve core and the flow passage, the connecting pipe 13 is fitted in the valve body 100 by friction welding and forms an upper and lower cavity passage extending along the axial direction of the control valve, and the cover 14 is fitted on the side of the valve body 100 away from the driving control part 3.

Referring to FIG. 1 to FIG. 9, in the first embodiment of the control valve 1000, in order to realize synchronous rotation of the first transmission part 45 and the first valve core 10, and synchronous rotation of the second transmission part 56 and the second valve core 12, in this embodiment, the first transmission part 45 is arranged on the first valve core 10 and fixedly connected with the first valve core 10, the second transmission part 56 is arranged on the second valve core 12 and fixedly connected with the second valve core 12. Optionally, the first transmission part 45 is integrally formed with the first valve core 10, the second transmission part 56 is integrally formed with the second valve core 12, or the first transmission part 45 and the first valve core 10 are welded into an integral structure, the second transmission part 56 and the second valve core 12 are welded into an integral structure, the first transmission part 45 is located at the side of the first valve core 10 close to the second valve core 12, the second transmission part 56 is located at the side of the second valve core 12 close to the first valve core 10, and in that case, the first transmission part 45 and the second transmission part 56 are close to each other, which can facilitate the first transmission part 45 of being in contact with the second transmission part 56 and thus pushing the second transmission part 56 to drive the second valve core 12 to rotate.

Figure 2:
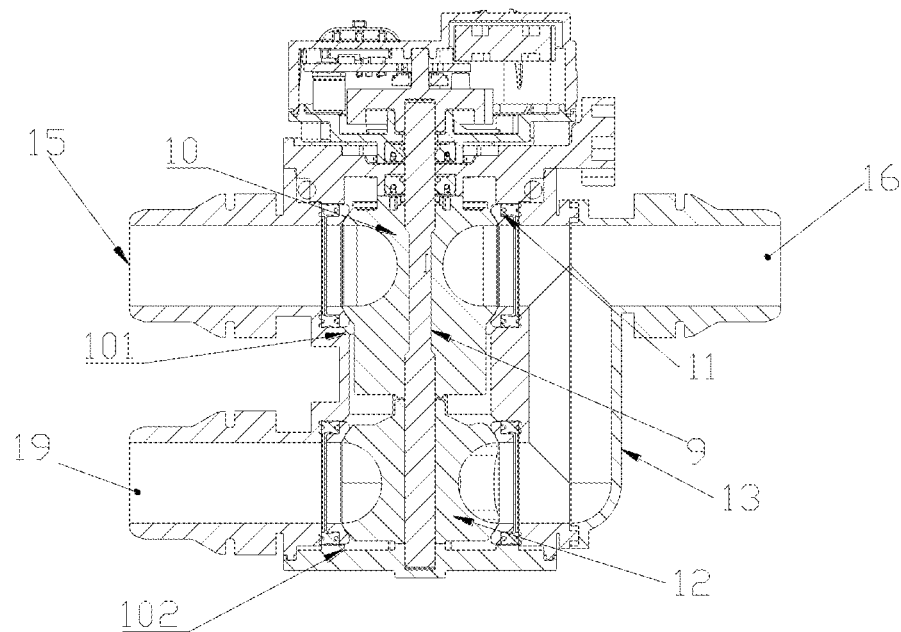
FIG. 2 is a sectional structure diagram of the control valve in FIG. 1.
Figure 3:
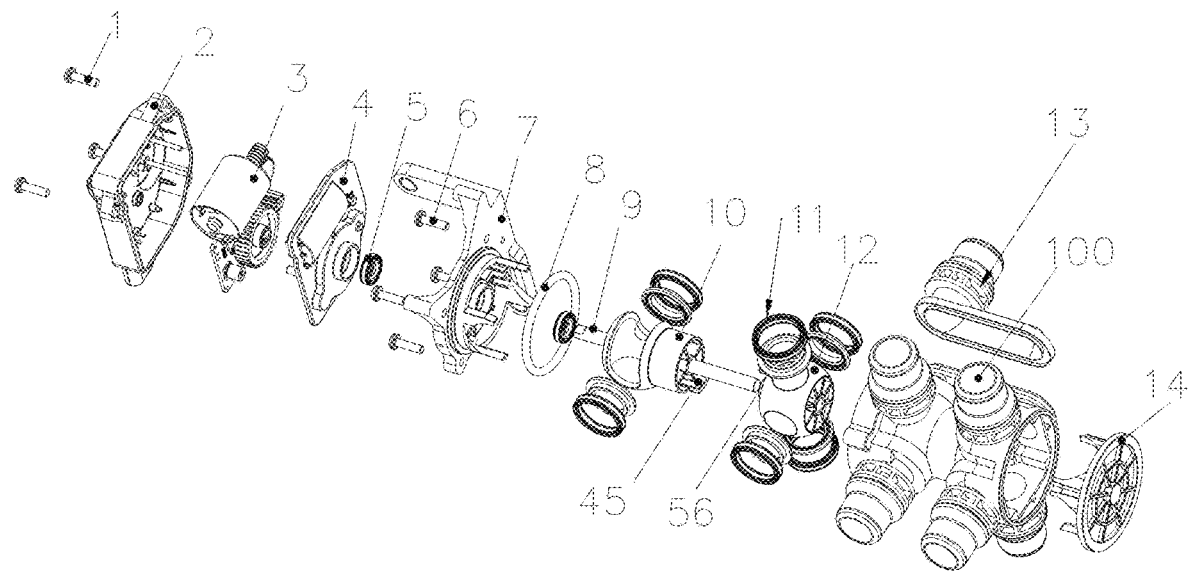
FIG. 3 is an exploded structural diagram of the control valve in FIG. 1.

As shown in FIG. 1 to FIG. 3, the valve body 100 is divided into a first valve body 101 and a second valve body 102 along the axial direction of the control valve 1000, that is, in FIG. 1 to FIG. 3, the axial direction of the control valve 1000 is the up-down direction in FIG. 1 and FIG. 2, the valve body 100 is divided into a first valve body 101 and a second valve body 102 according to the up-down structure, where the first valve body 101 includes a first pipe orifice 15, a second pipe orifice 16 and a third pipe orifice 17, which are arranged along a circumferential direction of the valve core. The second valve body 102 includes a fourth pipe orifice 18, a fifth pipe orifice 19 and a sixth pipe orifice 20, which are arranged along the circumferential direction of the valve core. In that case, the control valve 1000 has six pipe orifices. In this embodiment, a flow cross section of the pipe orifice is circular; of course, the flow cross section of the pipe orifice may also have other shapes. At least part of the first valve core 10 is located in the first valve body 101, and at least part of the second valve core 12 is located in the second valve body 102.

Figure 4:
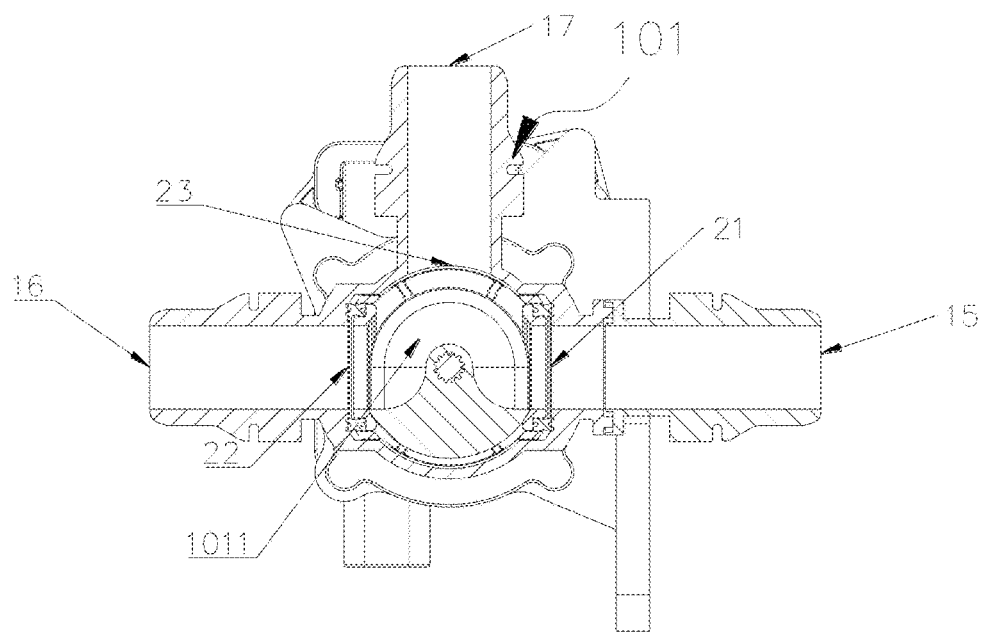
FIG. 4 is a sectional structure diagram of a first valve cavity shown in FIG. 1.
Figure 5:
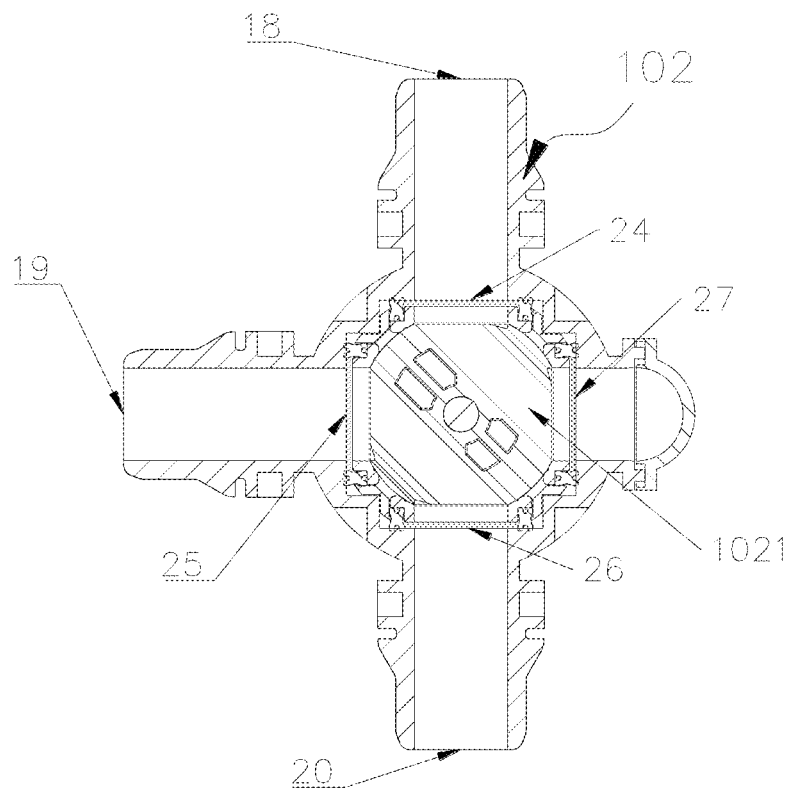
FIG. 5 is a sectional structure diagram of a second valve cavity shown in FIG. 1.

As shown in FIG. 3 to FIG. 5, the valve cavity includes a first valve cavity 1011 and a second valve cavity 1021, the first valve body 101 is formed as at least part of the wall of the first valve cavity 1011, the first valve body 101 has a first port 21, a second port 22 and a third port 23, and the first port 21, the second port 22 and the third port 23 are respectively in communication with the corresponding first pipe orifice 15, second pipe orifice 16 and third pipe orifice 17. Exemplarily, the first port 21 is in communication with the first pipe orifice 15, the second port 22 is in communication with the second pipe orifice 16, and the third port 23 is in communication with the third pipe orifice 17; the second valve body 102 is formed as at least part of the wall of the second valve cavity 1021, the second valve body 102 has a fourth port 24, a fifth port 25, a sixth port 26 and a seventh port 27, and the fourth port 24, the fifth port 25 and the sixth port 26 are respectively in communication with the corresponding fourth pipe orifice 18, fifth pipe orifice 19 and sixth pipe orifice 20. Exemplarily, the fourth port 24 is in communication with the fourth pipe orifice 18, the fifth port 25 is in communication with the fifth pipe orifice 19, and the sixth port 26 is in communication with the sixth pipe orifice 20. In that case the valve body 100 has seven ports, where the second port 22 is in communication with the seventh port 27 through the connecting pipe 13, the connecting pipe 13 is formed as a communication passage that communicates the first valve cavity 1011 and the second valve cavity 1021. Multiple sealing pieces 11 are located in the first valve cavity 1011 and the second valve cavity 1021, and are in contact with the valve core and the valve body for sealing. In this embodiment, the valve core can rotate under the control of the driving control part 3, specifically, both the first valve core 10 and the second valve core 12 can rotate under the control of the driving control part 3, the fluid passage of the valve core is matched with the port, so that the pipe orifice can in communication in the first valve cavity 1011 and the second valve cavity 1021, thereby realizing a passage communication and a flow regulation.

Figure 6:
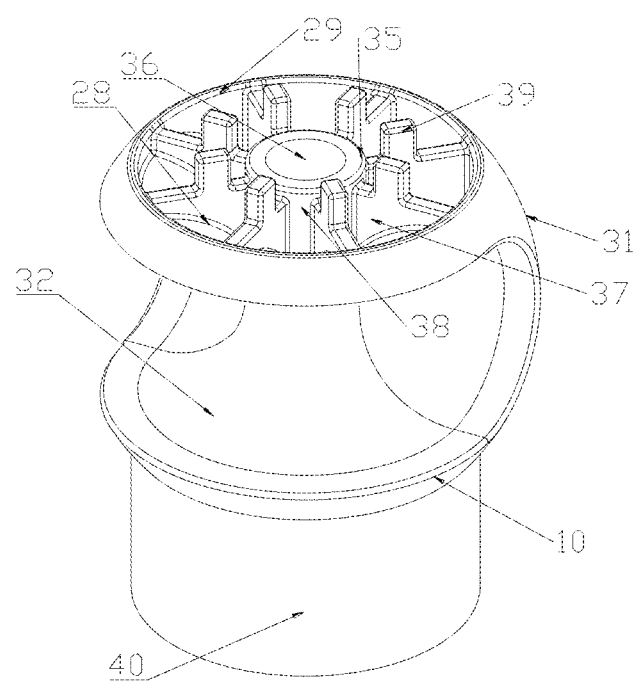
FIG. 6 is a three-dimensional structure diagram of a first valve core in FIG. 3 from one perspective.
Figure 7:
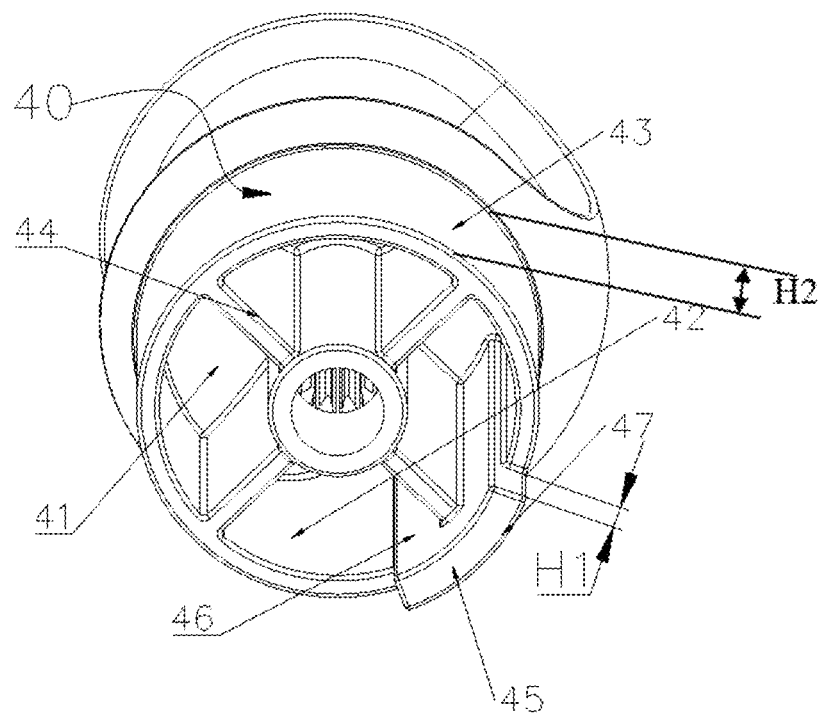
FIG. 7 is a three-dimensional structure diagram of the first valve core in FIG. 3 from another perspective.

As shown in FIG. 6 to FIG. 7, the first valve core 10 includes a first top surface part 28, a first top wall part 29, a first outer peripheral surface 31 and a first bottom surface part 41, where the first top wall part 29 surrounds the first top surface part 28 and protrudes from the first top surface part 28 in the direction away from the first bottom surface part 41, the first top surface part 28 and the first bottom surface part 41 are arranged opposite to each other, and at least part of the first outer peripheral surface 31 is located between the first top surface part 28 and the first bottom surface part 41. The first valve core 10 further includes a third transmission part 35, at least part of which extends from the first top surface part 28 to the first bottom surface part 41, the central axis of the third transmission part 35 may coincide with the central axis of the first valve core 10, a first transmission hole 36 is provided at the center of the third transmission part 35, the valve core shaft 9 extends through the first transmission hole 36 and is interference fit or welded with the third transmission part 35, or the third transmission part 35 is formed by injection molding with the valve core shaft 9 as an insert. As shown in FIG. 3, the valve core shaft 9 is an integral shaft, and the corresponding part of the valve core shaft 9 and the third transmission part 35 can be in interference fit, or the third transmission part 35 is formed by injection molding with the valve core shaft 9 as an insert. Multiple first ribs 37 are arranged between the third transmission part 35 and the first top wall part 29, the first rib 37 protrudes from the first top surface part 28 to a direction away from the first bottom surface part 41, that is, in FIG. 6, the first rib 37 protrudes upward from the first top surface part 28, and the first rib 37 extends radially from the first top wall part 29 toward the outer peripheral surface 38 of the third transmission part 35, and intersects with the third transmission part 35.

In an embodiment, in FIG. 3 and FIG. 6, the first rib 37 is provided with a strip protrusion 39, and the strip protrusion protrudes from the first rib 37, the strip protrusion 39 abuts against the adapter 7, which can share the pressure acting on the first top wall part 29, prolong the service life of the first top wall part 29, and better demoulding during the injection molding process. The first outer peripheral surface 31 of the first valve core 10 is provided with an opening 32, the opening 32 forms a fluid passage, and related ports and pipe orifices can be in communication with each other through the fluid passage. The first bottom surface part 41 of the first valve core 10 is provided with a connecting protrusion 40, the connecting protrusion 40 includes a first inner wall 42 and a first outer wall 43, the first inner wall 42 and the first outer wall 43 can be coaxially arranged, and the connecting protrusion 40 protrudes from the first bottom surface part 41 in an axial direction away from the first top surface part 28, and an inner diameter of the connecting protrusion 40 is greater than an outer diameter of the third transmission part 35. Multiple second ribs 44 are arranged between the connecting protrusion 40 and the third transmission part 35, the second rib 44 is connected with the connecting protrusion 40, a height of the second rib 44 can be consistent with a height of the connecting protrusion 40, the second rib 44 is connected between the connecting protrusion 40 and the third transmission part 35, and the second rib 44 can increase the strength of the connecting protrusion 40 and the third transmission part 35. The second rib 44 extends radially from the first inner wall 42 toward the third transmission part 35, and intersects the outer wall of the third transmission part 35. The connecting protrusion 40 is provided with a first transmission part 45 integrally connected with the connecting protrusion 40, the first transmission part 45 is protruded from the connecting protrusion 40 in a direction away from the first top wall part 29, the cross section of the first transmission part 45 is a sector ring, and its corresponding central angle can be set according to the user's requirements, for example, 50 degree, and thus it ensures that the sealing piece 11 has a sealing effect on the valve core within the designed rotation angle range. It should is understood that a cross section of the first transmission part 45 refers to the cross section of the first transmission part 45 taken in a direction perpendicular to the axial direction of the first valve core 10; the first transmission part 45 includes a first outer side surface 47 and a first inner side surface 46 arranged in a radial direction of the first transmission part 45, the first outer side surface 47 of the first transmission part 45 may partially coincide with the first outer wall 43, and the first inner side surface 46 can be connected with the second rib 44. A projection height H1 of the first transmission part 45 in the axial direction is less than a projection height H2 of the connecting protrusion 40 in the axial direction.

Figure 8:
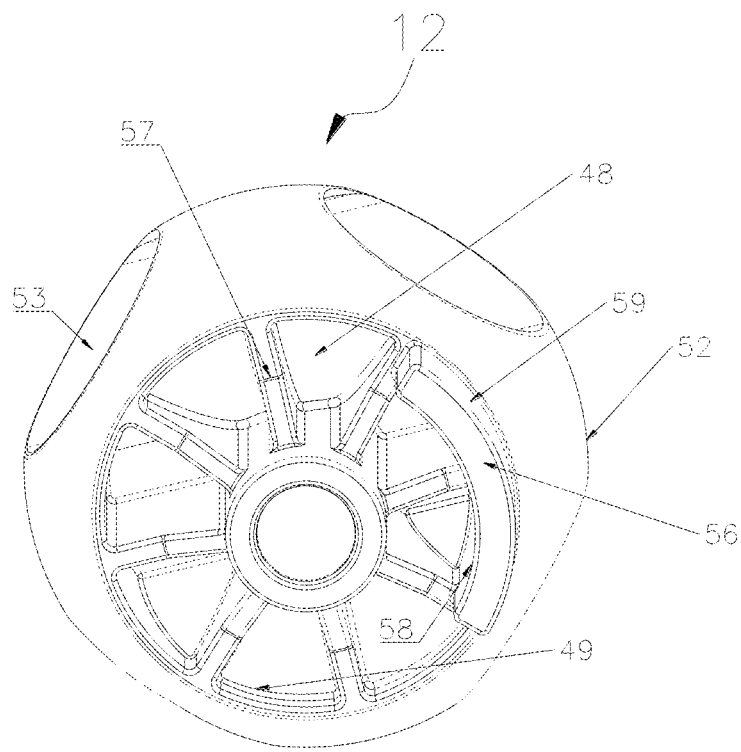
FIG. 8 is a three-dimensional structure diagram of a second valve core in FIG. 3 from one perspective.
Figure 9:
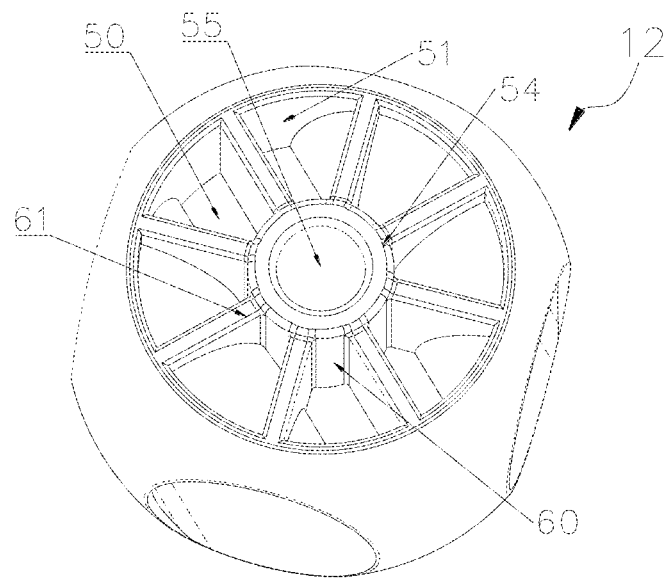
FIG. 9 is a three-dimensional structure diagram of the second valve core in FIG. 3 from another perspective.
Figure 10:
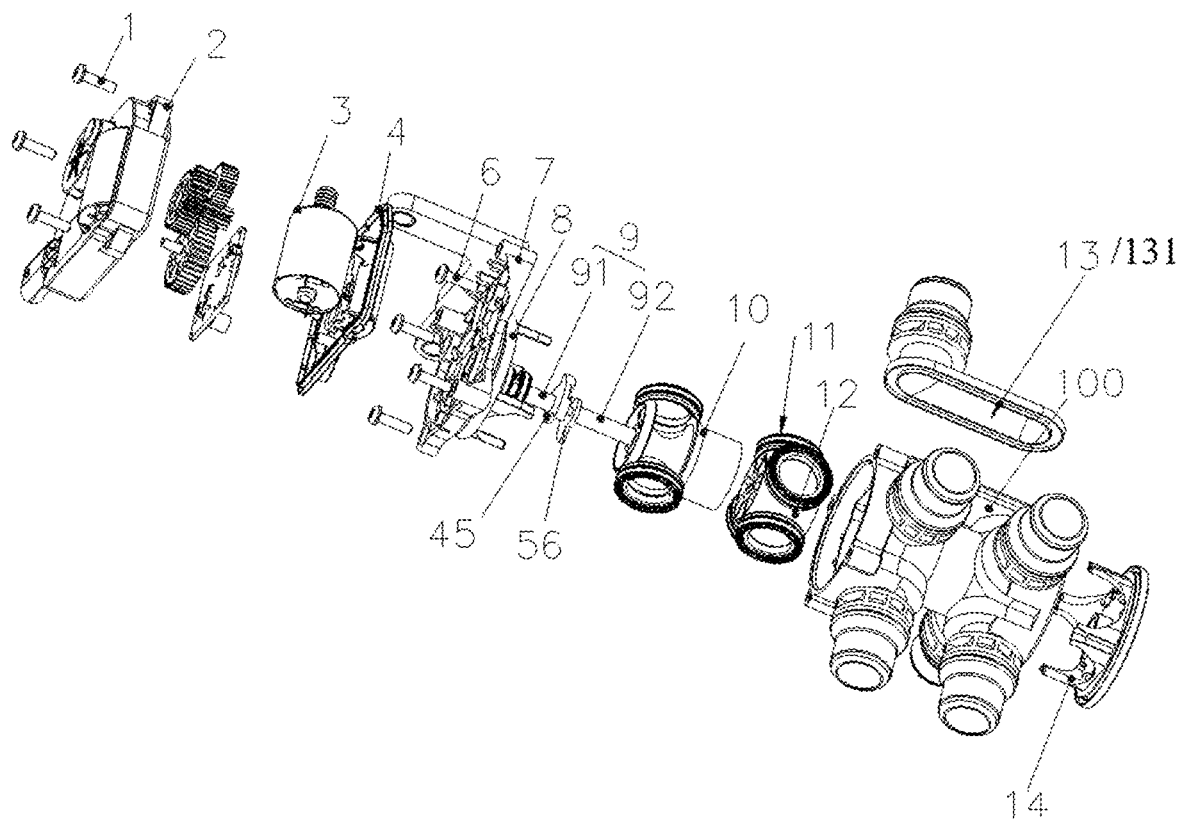
FIG. 10 is an exploded structural diagram of a second embodiment of the control valve provided in the disclosure.
Figure 11:
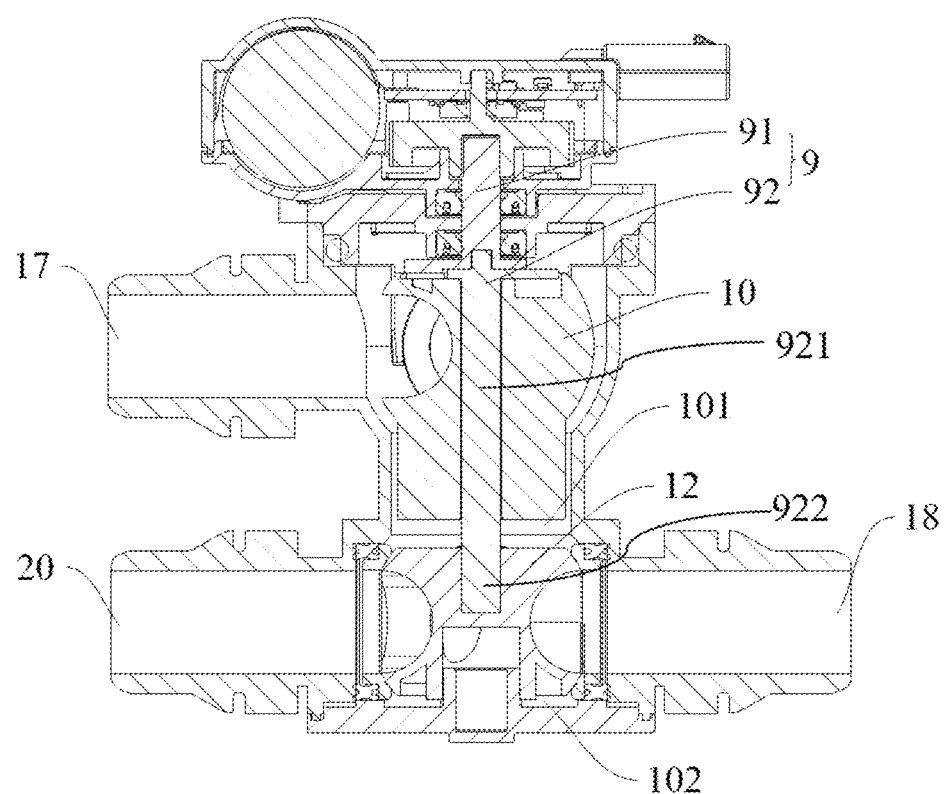
FIG. 11 is a sectional structure diagram of the control valve in FIG. 10.

As shown in FIG. 8 to FIG. 9, the second valve core 12 includes a second top surface part 48, a second top wall part 49, a second bottom surface part 50, a bottom wall part 51, a second outer peripheral surface 52 and a valve core hole 53, the second top wall part 49 surrounds the second top surface part 48 and protrudes from the second top surface part 48, the second top surface part 48 and the second bottom surface part 50 are arranged opposite to each other, at least part of the second outer peripheral surface 52 is located between the second top surface part 48 and the second bottom surface part 50, and the valve core hole 53 is located between the second top surface part 48 and the second bottom surface part 50. The second valve core 12 further includes a fourth transmission part 54, at least part of the fourth transmission part 54 extends from the second top surface part 48 toward the second bottom surface part 50, the central axis of the fourth transmission part 54 may coincide with the central axis of the second valve core 12, a second transmission hole 55 is provided at the center of the fourth transmission part 54, and the fourth transmission part 54 has a third outer wall 60, and the second transmission hole 55 is in clearance fit with the valve core shaft 9. In case that the second transmission part 56 is located in the second valve core 12 and integrally formed with the second valve core 12, the second transmission part 56 protrudes from the second top surface part 48 to the direction away from the second bottom surface part 50, the cross section of the second transmission part 56 is a sector ring, the central angle of the second transmission part 56 can be set according to the user's requirements, for example, 90 degree, so that the switch angle of the flow passage of the second valve body 102 is kept to be 90 degree, that is, the flow passage is switched once every 90 degree. Herein, a cross section of the second transmission part 56 refers to the cross section of the second transmission part 56 taken in a direction perpendicular to the axial direction of the second valve core 12. The second transmission part 56 includes a second inner side surface 58 and a second outer side surface 59 arranged in a radial direction of the second transmission part 56. Optionally, the second valve core 12 further includes multiple third ribs 57, the second inner side surface 58 may intersect with part of the third rib 57, the outer surface 59 of the second transmission part 56 may partially coincide with the outer surface of the second top wall part 49. The third rib 57 is protruding arranged from the second top surface part 48 in the direction away from the bottom wall part 51, that is, in FIG. 8, the third rib 57 protrudes upward from the second top surface part 48, and the third rib 57 extends from the second top wall part 49 in the radial direction toward the fourth transmission part 54, and intersects the third outer wall 60. The second bottom surface part 50 of the second valve core 12 is provided with multiple fourth ribs 61, the fourth rib 61 protrudes from the second bottom surface part 50 in the axial direction away from the second top surface part 48, and extends from the bottom wall part 51 in the radial direction toward the fourth transmission part 54, and intersects the third outer wall 60. The second outer peripheral surface 52 of the second valve core 12 is further provided with four valve core holes 53, which are spaced apart along the circumferential direction of the second valve core 12, that is, in FIG. 8, the valve core holes 53 are arranged in four directions: front, back, left and right. The second valve core 12 further includes two fluid passages inside, each fluid passage communicates with the corresponding two valve core holes 53. It can be understood that the fourth rib 61 or the third rib 57 may not be provided on the second valve core 12, which is not limited by the present disclosure.

Referring to FIG. 10 to FIG. 18, which is the second embodiment of the control valve 1000, the structure of the control valve 1000 provided in this embodiment is substantially the same with the structure of the control valve provided in the first embodiment, a three-dimensional structure of a control valve 1000 of the second embodiment is shown in FIG. 1. In this embodiment, a sectional structural schematic diagram showing the first valve cavity is shown in FIG. 4 while a sectional structural schematic diagram showing the second valve cavity is shown in FIG. 5, and the difference therebetween is in that, in this embodiment, the first transmission part 45 is position-limitedly connected with the first valve core 10 by the valve core shaft 9, the second transmission part 56 is position-limitedly connected with the second valve core 12 by the valve core shaft 9. Accordingly, the structures of the first valve core 10 and the second valve core 12 in the embodiment of the present disclosure are different from the structure of the valve core provided in the first embodiment, the control valve of the embodiment of the present disclosure is described below with reference to FIG. 10 to FIG. 18.

As shown in FIG. 10 to FIG. 18, the valve core shaft 9 includes a first shaft section 91 and a second shaft section 92, the first shaft section 91 can be connected with the driving control part 3, part of the first shaft section 91 and part of the second shaft section 92 are sleeved with each other, and the sleeve parts are clearance fit, the first shaft section 91 can drive the first valve core 10 to rotate, and the second shaft section 92 can drive the second valve core 12 to rotate, the first transmission part 45 is connected to the outer peripheral side of the first shaft section 91. Optionally, the first transmission part 45 is fixedly connected with the first shaft section 91, for example, the first transmission part 45 is integrally formed with the first shaft section 91, the first valve core 10 further includes a limiting part XW, which is connected between the third transmission part 35 and the first top wall part 29, the limiting part XW protrudes from the first top surface part 28 in the direction away from the first bottom surface part 41, the limiting part XW extends from the first top wall part 29 in the radial direction toward the third transmission part 35 and intersects with the third transmission part 35, the first transmission part 45 includes a fitting part 451. One of the fitting part 451 and the limiting part XW has a groove structure, and the other of the fitting part 451 and the limiting part XW has a convex structure. The fitting part 451 is engaged with the limiting part XW in a clamping way, so that the fitting part 451 and the limiting part XW can transmit driving force to realize the transmission connection between the first valve core 10 and the first transmission part 45, so that the first transmission part 45 drives the first valve core 10 to rotate synchronously through the fitting part 451 and the limiting part XW, thus realizing the transmission connection between the first transmission part 45 and the first valve core 10. Optionally, a central angle corresponding to the cross section of the first transmission part 45 may be 110 degree.

Figure 12:
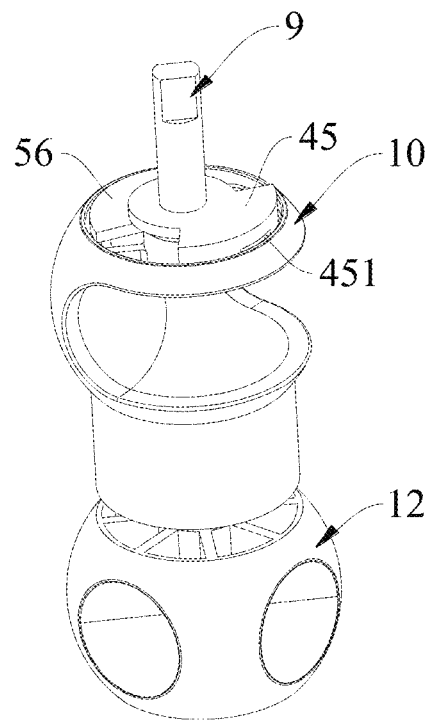
FIG. 12 is a schematic diagram of an assembly structure of a valve core shaft, the first valve core and the second valve core in FIG. 10.
Figure 13:
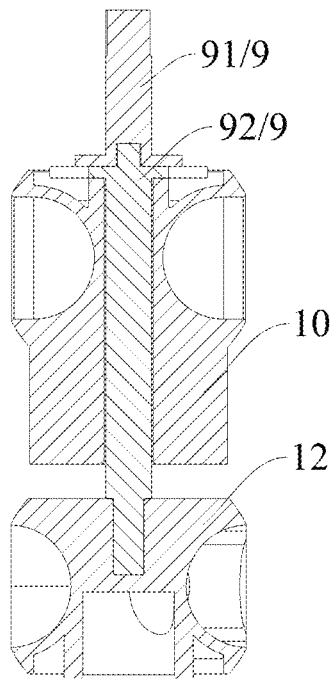
FIG. 13 is a sectional structure diagram of the assembly structure shown in FIG. 12.
Figure 14:
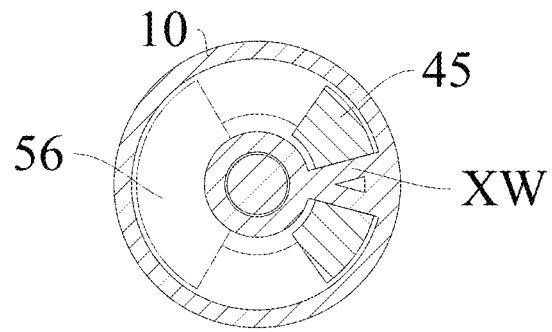
FIG. 14 is another sectional structure diagram of the assembly structure shown in FIG. 12.
Figure 15:
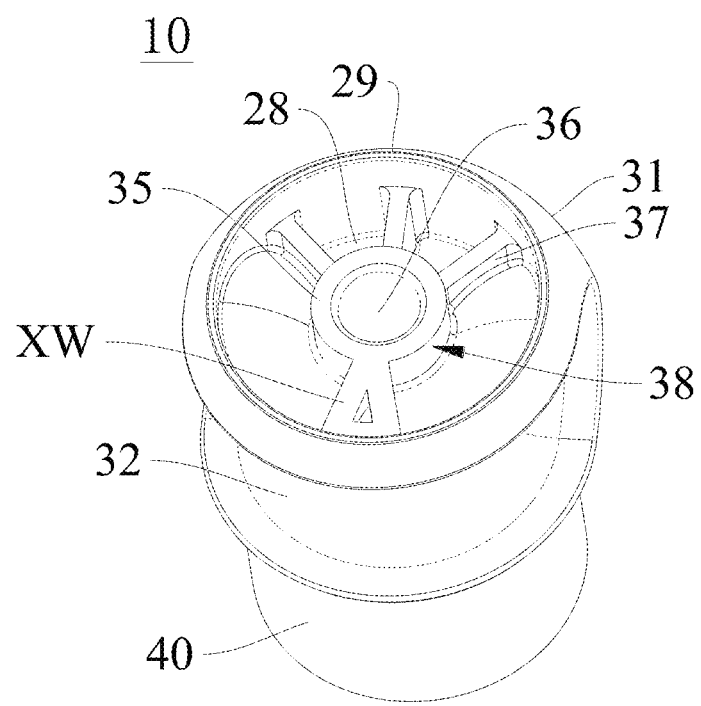
FIG. 15 is a three-dimensional structure diagram of the first valve core in FIG. 10 from one perspective.
Figure 16:
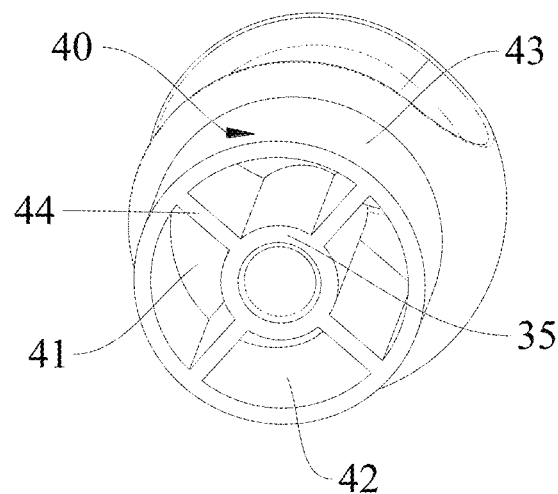
FIG. 16 is a three-dimensional structure diagram of the first valve core in FIG. 10 from another perspective.
Figure 17:
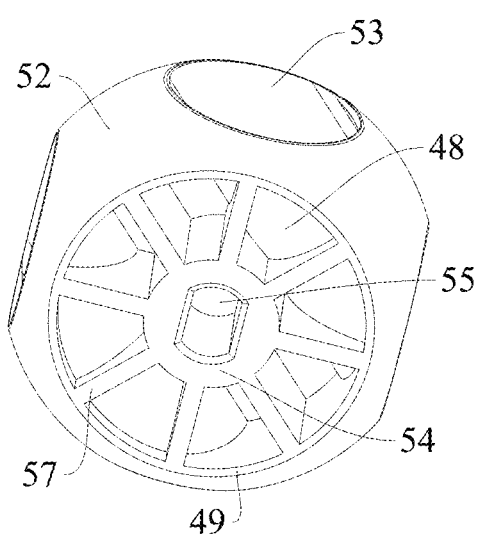
FIG. 17 is a three-dimensional structure diagram of a second valve core in FIG. 10 from one perspective.
Figure 18:
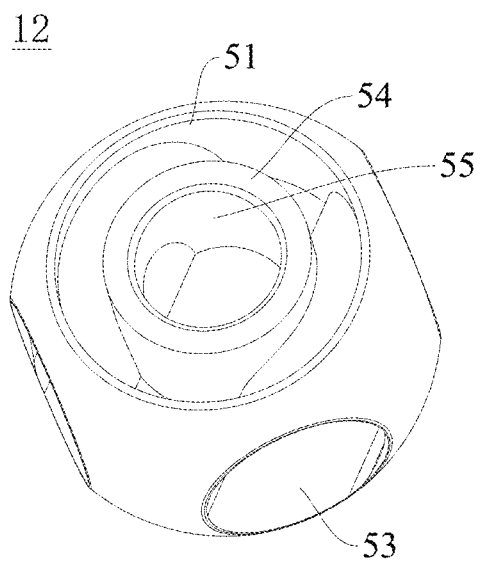
FIG. 18 is a three-dimensional structure diagram of the second valve core in FIG. 10 from another perspective.

The second transmission part 56 is connected to the outer peripheral side of the second shaft section 92, optionally, the second transmission part 56 is fixedly connected with the second shaft section 92, for example, the second transmission part 56 is integrally formed with the second shaft section 92, the second shaft section 92 includes a first subsection 921 and a second subsection 922 arranged in the axial direction. The first subsection 921 is sleeved on the inner peripheral side of the first valve core 10 and is in clearance fit with the first valve core 10, at least part of the second subsection 922 is located in the second valve core 12 and is in interference fit or fixed connection with the second valve core 12, specifically, the first subsection 921 extends through the first transmission hole 36 of the first valve core 10 and is in clearance fit with the third transmission part 35, at least part of the second subsection 922 is located in the second transmission hole 55 of the second valve core 12 and is in interference fit or fixedly connected with the fourth transmission part 54, for example, the second subsection 922 is fixed with the fourth transmission part 54 by welding, or the fourth transmission part 54 is integrally molded by injection molding with the second shaft section 92 as an insert, so that the second transmission part 56 is position-limitedly connected with the second valve core 12 by the second shaft section 92, the first transmission part 45 and the second transmission part 56 are both located on the side of the first valve core 10 away from the second valve core 12, and thus the first transmission part 45 and the second transmission part 56 are close to each other, so that the first transmission part 45 is in contact with the second transmission part 56 within a preset angle range and pushes the second valve core 12 to rotate. In an embodiment, a central angle corresponding to the cross section of the second transmission part 56 may be 120 degree. As shown in FIG. 12, along the axial direction of the control valve, the bottom wall of the first transmission part 45 toward the second transmission part 56 is lower than the top wall of the second transmission part 56 toward the first transmission part 45, so that the first transmission part 45 is in contact with the second transmission part 56 within a preset angle range and pushes the second valve core 12 to rotate.

The control valve 1000 in this embodiment can be used in a control valve system to control the fluid, and the control valve system may include a control valve 1000 and a heat exchanger for heat exchange. A control valve system is further provided according to an embodiment of the present disclosure, including a connecting piece and the control valve 1000 of any of the above embodiments, wherein the connecting piece has a communication cavity, the valve body 100 includes a first valve body 101 and a second valve body 102, the first valve core 10 is located in the first valve body 101, the second valve core 12 is located in the second valve body 102; part of the pipe orifice located in the first valve body 101 is in communication with the communication cavity of the connecting piece, and the connecting piece is at least one of a fluid component and a bypass pipeline, in this embodiment, the fluid component can be, but is not limited to, a heat exchanger, an evaporator or a throttling component.

Figure 19:
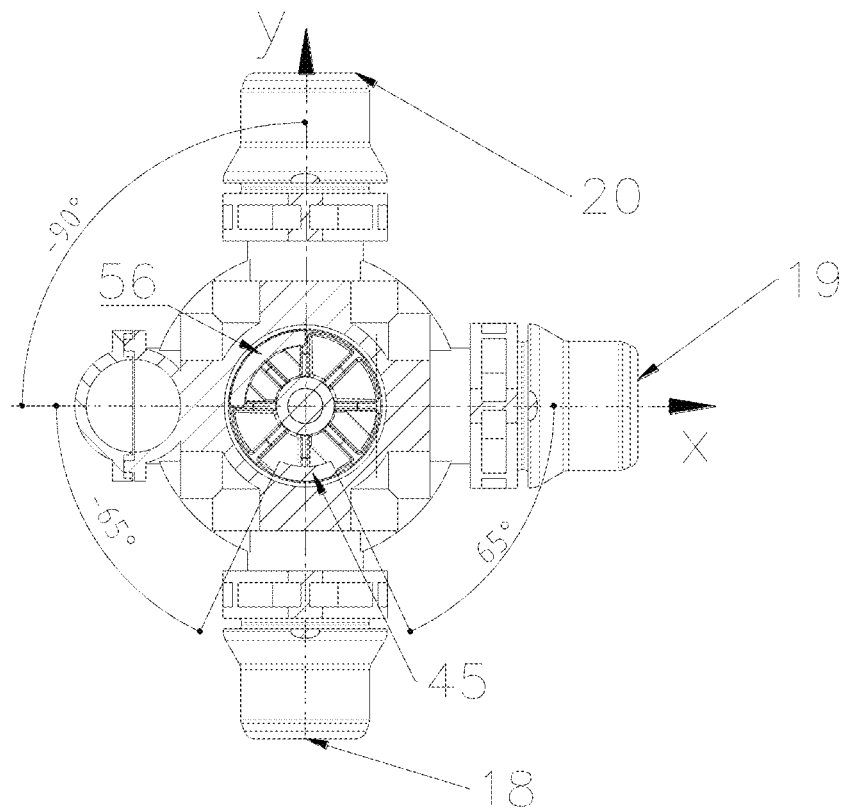
FIG. 19 is a sectional structure diagram of the positional relation between a first transmission part and a second transmission part of the first embodiment of the control valve provided in FIG. 1 and FIG. 10.
Figure 20:
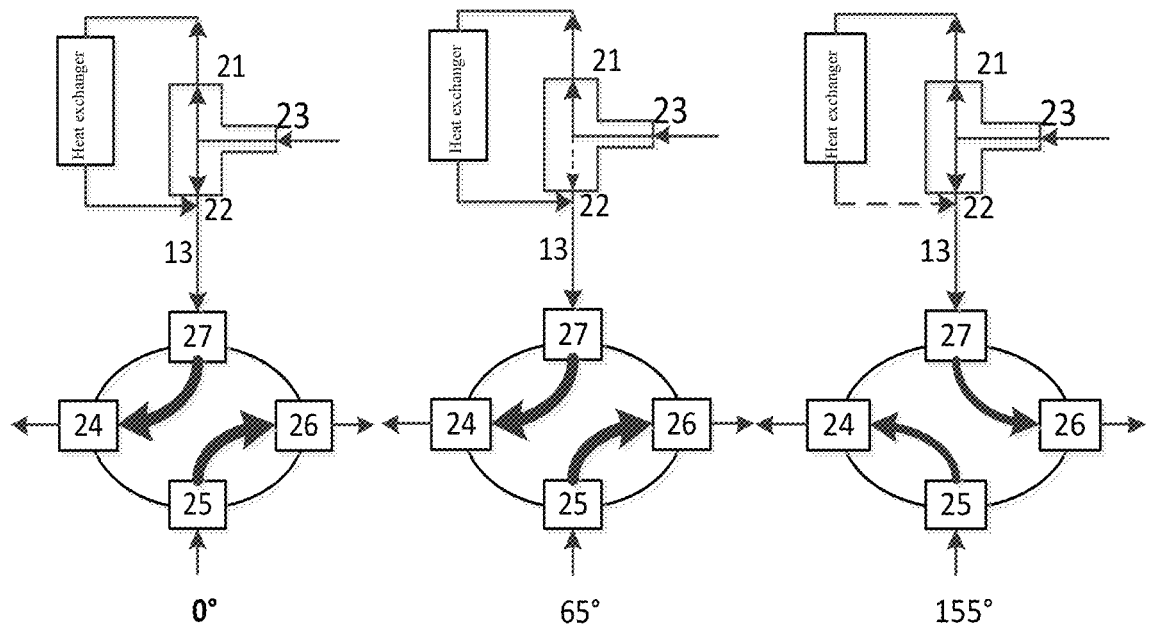
FIG. 20 is a schematic diagram of a flow passage switched position between a valve core rotation angle of 0 degree and 155 degree in a control valve system provided by the first embodiment of the present disclosure.
Figure 21:
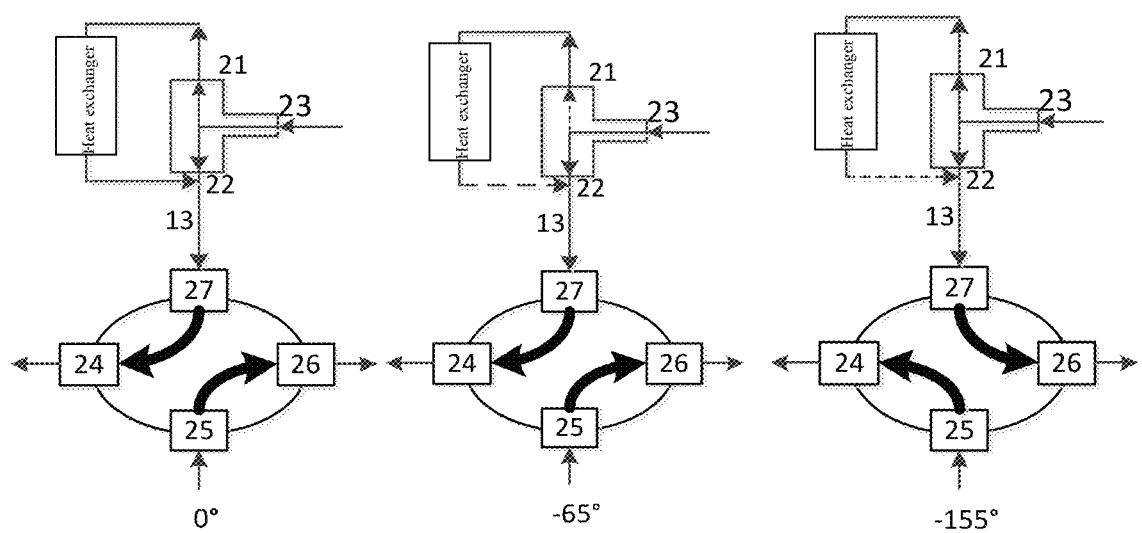
FIG. 21 is a schematic diagram of a flow passage switched position between a valve core rotation angle of −155 degree and 0 degree in the control valve system provided by the first embodiment of the present disclosure.

As shown in FIG. 19, this embodiment describes the rotational angle-position relation between the first transmission part 45 and the second transmission part 56 of the control valve provided by the first embodiment of the present disclosure, the central angle of the first transmission part 45 is 50 degree, and the central angle of the second transmission part 56 is 90 degree. It is defined that the counterclockwise rotation angle of the valve core is positive, and the clockwise rotation angle is negative, the center line of the fifth pipe orifice 19 is taken as a horizontal reference and as an X axis, and the center line of the fourth pipe orifice 18 or the sixth pipe orifice 20 is taken as a vertical reference and as a Y axis. The center of the first transmission part 45 is located on the Y axis and at the position of 0 degree, the included angles between the two end faces of the first transmission part 45 arranged along the circumferential direction and the X axis are −65 degree and 65 degree, respectively.

As shown in FIG. 4, FIG. 5 and FIG. 20 to FIG. 21, the dotted line in the control valve system indicates a dis-communication state, and the solid line indicates a communication state, the third pipe orifice 17 and the fifth pipe orifice 19 can be provided as fixed inlet pipes in the control valve system, fluid can flow into the valve body from the third port 23 and the fifth port 25. The inlet pipe can be adjusted according to the needs of users, and this disclosure is not limited to this. The first pipe orifice 15 and the second pipe orifice 16 can be in communication by the heat exchanger or a bypass pipeline. Since the first pipe orifice 15 corresponds to and is in communication with the first port 21, and the second pipe orifice 16 corresponds to and is in communication with the second port 22, in this embodiment with the heat exchanger being taken as an example, the fluid at the first port 21 can reach the second port 22 through the heat exchanger, the second port 22 is in communication with the seventh port 27 through the connecting pipe 13, and thus the fluid can flow from the second port 22 into the seventh port 27, so that the fluid in the first valve body 101 flows into the second valve body 102. When the driving control part 3 is energized, the driving control part 3 drives the valve core shaft 9 to rotate, the relative position between the fluid passage and the port of the valve cavity in the first valve core 10 and the second valve core 12 is changed, thereby realizing various valve core combinations and flow passage modes.

When the first valve core 10 rotates from the 0 degree position within the range of −65 degree to 65 degree in the coordinate axis, the first transmission part 45 and the second transmission part 56 are not in contact, and the second valve core 12 does not rotate with the first valve core 10, and thus the flow direction of the fluid in the second valve body 102 does not change. In case that the rotation angle of the first valve core 10 is at −65 degree, that is, rotating for 65 degree clockwise from the 0 degree position, the first port 21 is blocked by the first valve core 10, and the heat exchanger is not in communication with the first port 21 and the second port 22. In that case, the flow direction of the fluid in the first valve body 101 is from the third port 23 to the second port 22, the fluid discharged from the second port 22 flows to the seventh port 27 through the connecting pipe 13, the fluid flow direction in the second valve body 102 is from the seventh port 27 to the fourth port 24 as well as from the fifth port 25 to the sixth port 26. In case that the rotation angle of the first valve core 10 is at 0 degree, the heat exchanger communicates the first port 21 with the second port 22, the flow direction of the fluid in the first valve body 101 is from the third port 23 to the first port 21, from the third port 23 to the second port 22, and from the first port 21 to the second port 22 through a heat exchanger, and the fluid flow direction in the second valve body 102 is from the seventh port 27 to the fourth port 24, and from the fifth port 25 to the sixth port 26. In case that the rotation angle of the first valve core 10 is at the position of 65 degree, that is, the first valve core 10 rotates counterclockwise from the position of 0 degree by 65 degree, the second port 22 is blocked by the first valve core 10, and the heat exchanger communicates the first port 21 with the second port 22, the flow direction of the fluid in the first valve body 101 is from the first port 21 to the second port 22, the fluid flow direction in the second valve body 102 is from the seventh port 27 to the fourth port 24 as well as from the fifth port 25 to the sixth port 26. In case that the rotation angle of the first valve core 10 is within the range of −65 degree to −155 degree, the first transmission part 45 is in contact with the second transmission part 56, and the first valve core 10 pushes the second valve core 12 to rotate clockwise. In case that the rotation angle of the first valve core 10 is at the position of −155 degree, that is, the first valve core 10 rotates clockwise by 155 degree from the position of 0 degree, the heat exchanger is not in communication with the first port 21 and the second port 22, and the first valve core 10 pushes the second valve core 12 to rotate by 90 degree clockwise. In that case, the flow direction of the fluid in the first valve body 101 is from the third port 23 to the first port 21 and the second port 22, the fluid flow direction in the second valve body 102 is from the seventh port 27 to the sixth port 26 as well as from the fifth port 25 to the fourth port 24. In case that the first valve core 10 rotates by 155 degree clockwise from 0 degree position to push the second valve core 12 to rotate so as to switch position, based on this, when the counterclockwise rotation angle of the first valve core 10 is between 65 degree and 155 degree, the first transmission part 45 can be in contact with the second transmission part 56, and the first valve core 10 pushes the second valve core 12 to rotate counterclockwise. In case that the rotation angle of the first valve core 10 is at the position of 155 degree, that is, the first valve core 10 rotates counterclockwise from the position of 0 degree by 155 degree, the heat exchanger is not in communication with the first port 21 and the second port 22, and the first valve core 10 pushes the second valve core 12 to rotate by 90 degree counterclockwise. In that case, the flow direction of fluid in the first valve body 101 is from the third port 23 to the first port 21 as well as from the third port 23 to the second port 22, and the fluid flow direction in the second valve body 102 is from the seventh port 27 to the sixth port 26 as well as from the fifth port 25 to the fourth port 24. Some of the switched modes of the control valve 1000 are listed schematically above, during the clockwise or counterclockwise rotation of the first valve core 10, the control valve 1000 can be switched in various flow passage modes, for example, the first valve core 10 can be rotated for 155 degree counterclockwise from the 0 degree position and then for 90 degree clockwise, the first valve core 10 drives the second valve core 12 to rotate counterclockwise to achieve various flow passage switched modes, which is not repeated.

Figure 22:
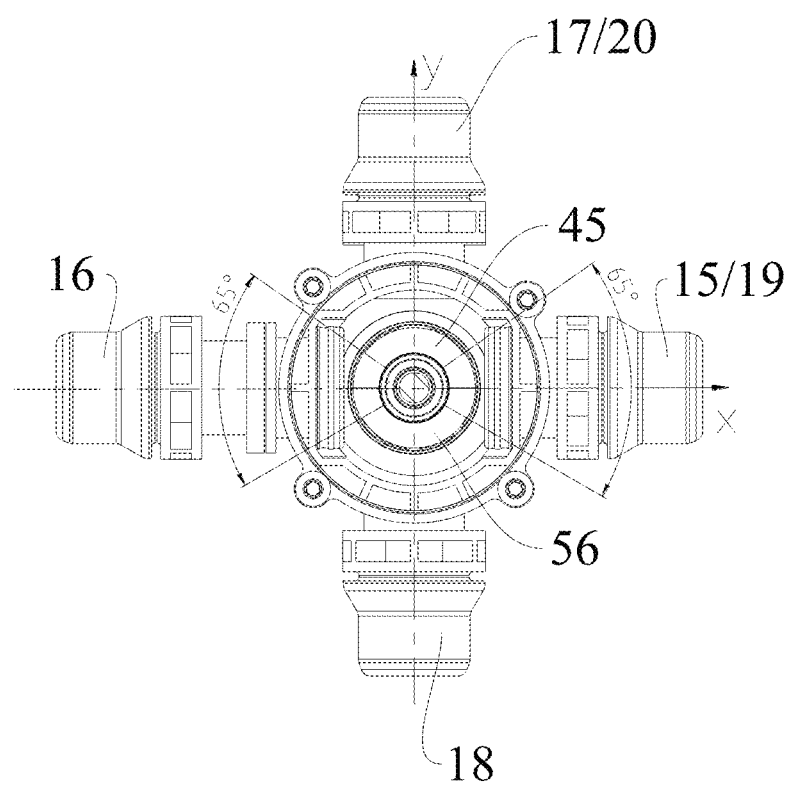
FIG. 22 is a sectional structure diagram of the positional relation between a first transmission part and a second transmission part of the second embodiment of the control valve provided in FIG. 1 and FIG. 10.
Figure 23A:
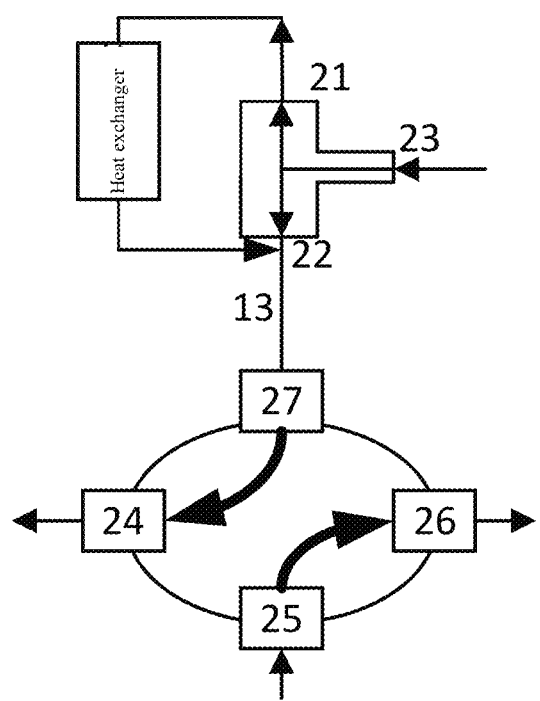
FIG. 23a to FIG. 23e are schematic diagrams of flow passage switched positions of various modes corresponding to the rotation angle of the valve core in the control valve system provided by the second embodiment of the present disclosure.
Figure 23B:
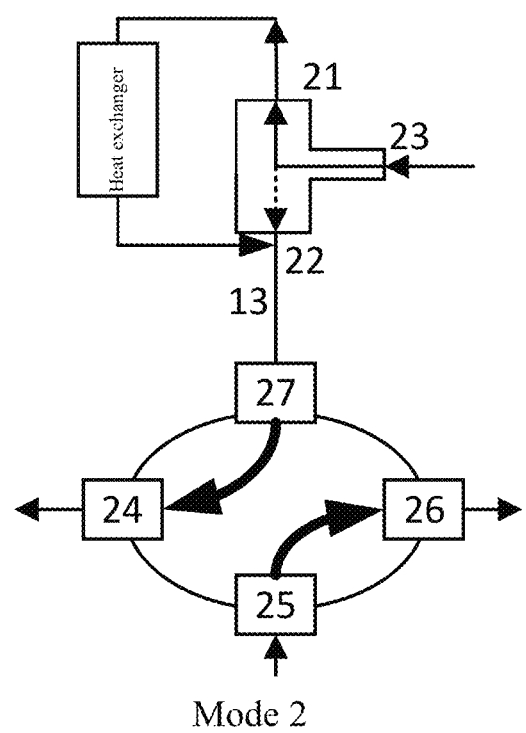
Figure 23C:
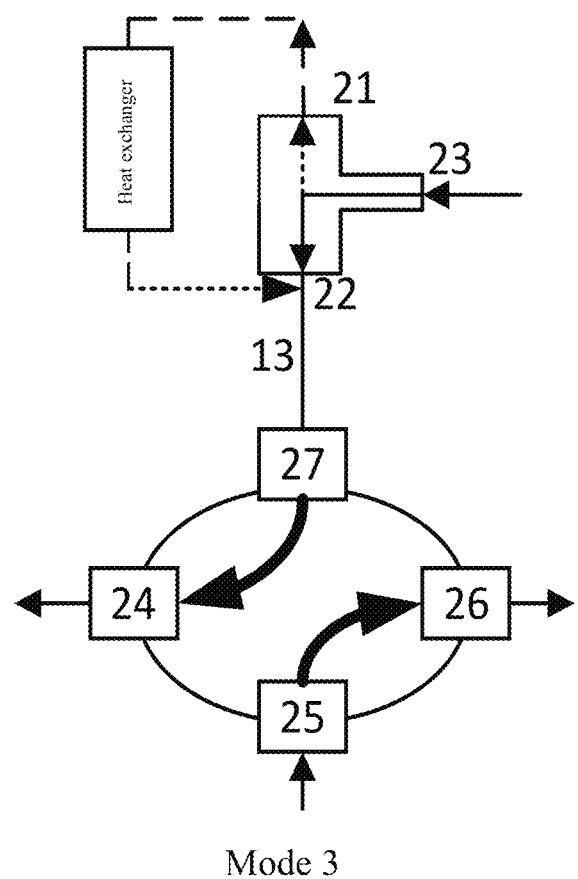
Figure 23D:
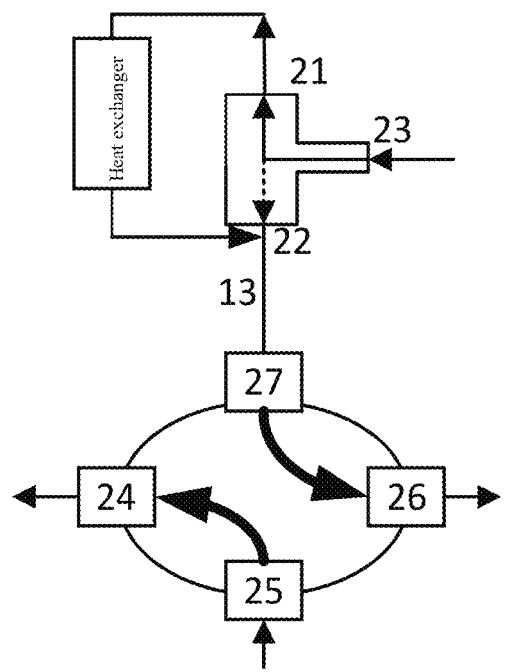
Figure 23E:
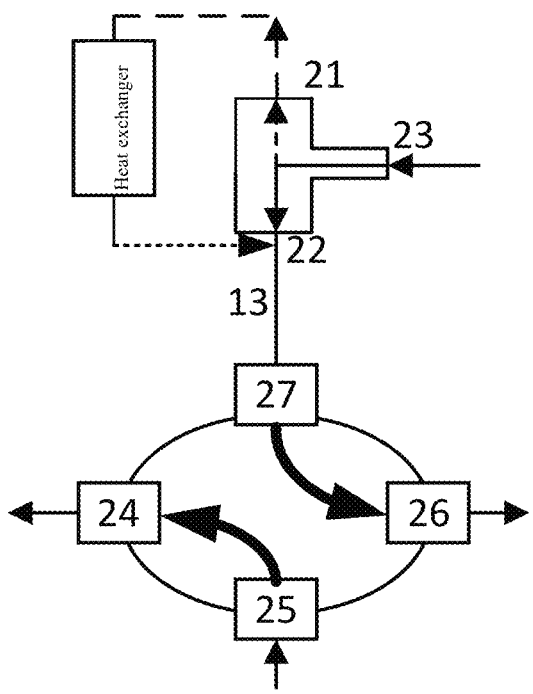

As shown in FIG. 22, this embodiment describes the rotational angle-position relation between the first transmission part 45 and the second transmission part 56 of the control valve provided by the first embodiment of the present disclosure, the central angle of the first transmission part 45 is 110 degree, and the central angle of the second transmission part 56 is 120 degree, it is defined that the counterclockwise rotation angle of the valve core is positive, and the clockwise rotation angle is negative, the center line of the fifth pipe orifice 19 is taken as a horizontal reference and as an X axis, the center line of the fourth pipe orifice 18 or the sixth pipe orifice 20 is taken as a vertical reference and as a Y axis. The center of the first transmission part 45 is located on the Y axis and at the position of 0 degree, the center of the second transmission part 56 is located on the Y axis and at the position of 0 degree, and in that case the first valve core 10 is at the 0 degree position, and the second valve core 12 is at the 0 degree position.

As shown in FIG. 22, FIG. 23a to FIG. 23e, the dotted line in the control valve system indicates a dis-communication state, and the solid line indicates a communication state, the third pipe orifice 17 and the fifth pipe orifice 19 can be provided as fixed inlet pipes in the control valve system, fluid can flow into the valve body from the third port 23 and the fifth port 25. The inlet pipe can be adjusted according to the needs of users, and this disclosure is not limited to this. The first pipe orifice 15 and the second pipe orifice 16 can be in communication by the heat exchanger or a bypass pipeline. Since the first pipe orifice 15 corresponds to and is in communication with the first port 21, the second pipe orifice 16 corresponds to and is in communication with the second port 22, in this embodiment with the heat exchanger being taken as an example, the fluid at the first port 21 can reach the second port 22 through the heat exchanger, the second port 22 is in communication with the seventh port 27 through the connecting pipe 13, and thus the fluid can flow from the second port 22 to the seventh port 27, so that the fluid in the first valve body 101 flows into the second valve body 102. When the driving control part 3 is energized, the driving control part 3 drives the first shaft section 91 and the first transmission part 45 to rotate. Within the preset angle range, the first transmission part 45 drives the second transmission part 56 to rotate, so that the relative position between the fluid passage and the port of the valve cavity in the first valve core 10 and the second valve core 12 is changed, thereby realizing various valve core combinations and flow passage modes.

In case that the first transmission part 45 drives the first valve core 10 to rotate by 65 degree clockwise or 65 degree counterclockwise from the 0 degree position, the first transmission part 45 and the second transmission part 56 are not in contact, and thus the second valve core 12 does not rotate with the first valve core 10, and the flow direction of the fluid in the second valve body 102 is not change.

In case that the first transmission part 45 is at 0 degree and the second transmission part 56 is at 0 degree, the control valve 1000 is in a first mode, the flow direction of fluid in the first valve body 101 is from the third port 23 to the second port 22, from the third port 23 to the first port 21, and from the first port 21 to the second port 22 through the heat exchanger, the fluid discharged from the second port 22 flows to the seventh port 27 through the connecting pipe 13, the fluid flow direction in the second valve body 102 is from the seventh port 27 to the fourth port 24, and from the fifth port 25 to the sixth port 26. In case that the first valve core 10 rotates by 65 degree clockwise from the 0 degree position, the second valve core 12 does not move, that is, in case that the second valve core 12 is at the 0 degree position, the control valve 1000 is in a second mode, the second port 22 is blocked by the first valve core 10, the heat exchanger communicates the first port 21 with the second port 22, and in that case the flow direction of fluid in the first valve body 101 is from the third port 23 to the first port 21, and from the first port 21 to the second port 22 through the heat exchanger, and then the fluid discharged from the second port 22 flows to the seventh port 27 through the connecting pipe 13, and the fluid flow direction in the second valve body 102 is from the seventh port 27 to the fourth port 24 as well as from the fifth port 25 to the sixth port 26. In case that the first valve core 10 rotates by 65 degree counterclockwise from the 0 degree position, the second valve core 12 does not move, that is, in case that the second valve core 12 is at the 0 degree position, the control valve 1000 is in a third mode, the first port 21 is blocked by the first valve core 10, and the flow direction of the fluid in the first valve body 101 is from the third port 23 to the second port 22, the fluid discharged from the second port 22 flows into the seventh port 27 of the second valve body 102 through the connecting pipe 13, the fluid flow direction in the second valve body 102 is from the seventh port 27 to the fourth port 24 as well as from the fifth port 25 to the sixth port 26. In case that the first valve core 10 rotates by 155 degree clockwise from the 0 degree position, the first valve core 10 drives the second valve core 12 to rotate by 90 degree clockwise, and then the first valve core 10 rotates by 90 degree counterclockwise, the control valve 1000 is in a fourth mode, and in that case, the flow direction of fluid in the first valve body 101 is from the third port 23 to the first port 21, and from the first port 21 to the second port 22 through the heat exchanger, the fluid discharged from the second port 22 then flows to the seventh port 27 through the connecting pipe 13, the fluid flow direction in the second valve body 102 is from the seventh port 27 to the sixth port 26 as well as from the fifth port 25 to the fourth port 24. In case that the first valve core 10 rotates by 155 degree counterclockwise from the 0 degree position, the first valve core 10 drives the second valve core 12 to rotate by 90 degree counterclockwise, then the first valve core 10 rotates by 90 degree clockwise, the control valve 1000 is in a fifth mode, and in that case the first port 21 is blocked by the first valve core 10, and the flow direction of the fluid in the first valve body 101 is from the third port 23 to the second port 22, the fluid discharged from the second port 22 flows into the seventh port 27 of the second valve body 102 through the connecting pipe 13, the fluid flow direction in the second valve body 102 is from the seventh port 27 to the sixth port 26 as well as from the fifth port 25 to the fourth port 24. Some of the switched modes of the control valve 1000 are listed schematically above, during the first transmission part 45 drives the first valve core 10 to rotate clockwise or counterclockwise, the control valve 1000 can be switched in various flow passage modes.

Figure 24:
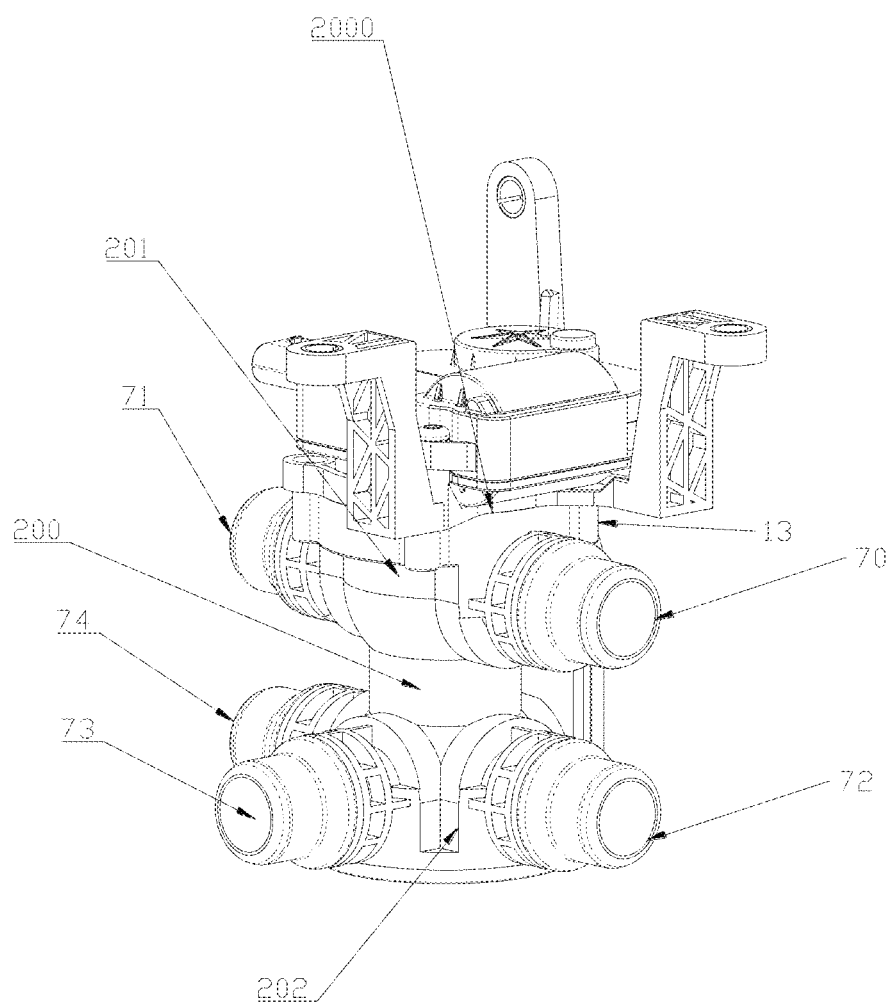
FIG. 24 is a three-dimensional structure diagram of a third embodiment of the control valve.
Figure 25:
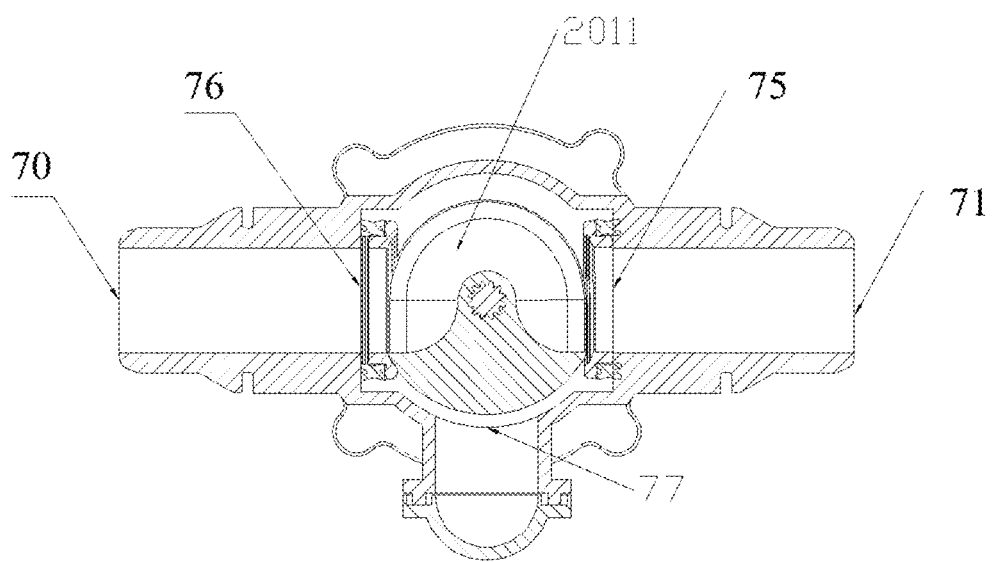
FIG. 25 is a sectional structure diagram of a first valve cavity shown in FIG. 24.
Figure 26:
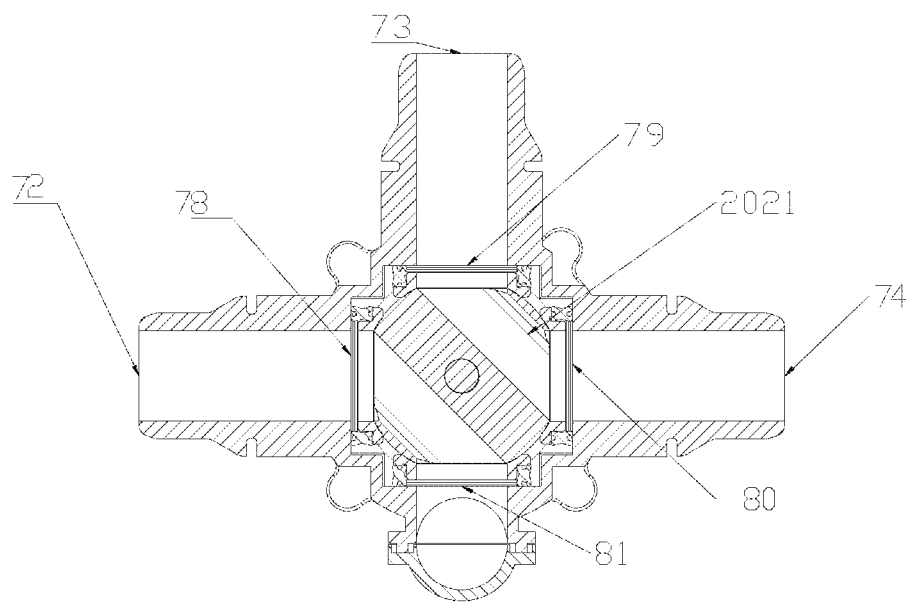
FIG. 26 is a sectional structure diagram of a second valve cavity shown in FIG. 24.

The third embodiment of the control valve 1000 is shown in FIG. 24 to FIG. 26, the difference from the first embodiment is that: the first valve body 201 has one less pipe orifice thereon than that of the first embodiment, and the position of connecting pipe 13 is changed. The first valve body 201 is provided with a first pipe orifice 70 and a second pipe orifice 71, and accordingly, the first valve cavity 2011 is provided with a first port 75 and a second port 76, which are aligned and in communication with the pipe orifices. The first valve body 201 further includes a third port 77. The second valve body 202 is provided with a third pipe orifice 72, a fourth pipe orifice 73 and a fifth pipe orifice 74, and accordingly, a fourth port 78, a fifth port 79 and a sixth port 80 in communication with the pipe orifice are respectively arranged in the second valve cavity 2021. Exemplarily, the first pipe orifice 70 is in communication with the second port 76, the second pipe orifice 71 is in communication with the first port 75, and the third pipe orifice 72 is in communication with the fourth port 78, the fourth pipe orifice 73 is in communication with the fifth port 79, and the fifth pipe orifice 74 is in communication with the sixth port 80. The second valve cavity 1021 further includes a seventh port 81, where the connecting pipe 13 communicates the third port 77 with the seventh port 81, forming a upper and lower cavity passage that extends along the axial direction of the control valve, so that the connecting pipe 13 is formed as a communication passage that communicates the first valve cavity 2011 with the second valve cavity 2021. In this embodiment, a flow cross section of the pipe orifice is circular; of course, the flow cross section of the pipe orifice may also have other shapes.

Figure 27:
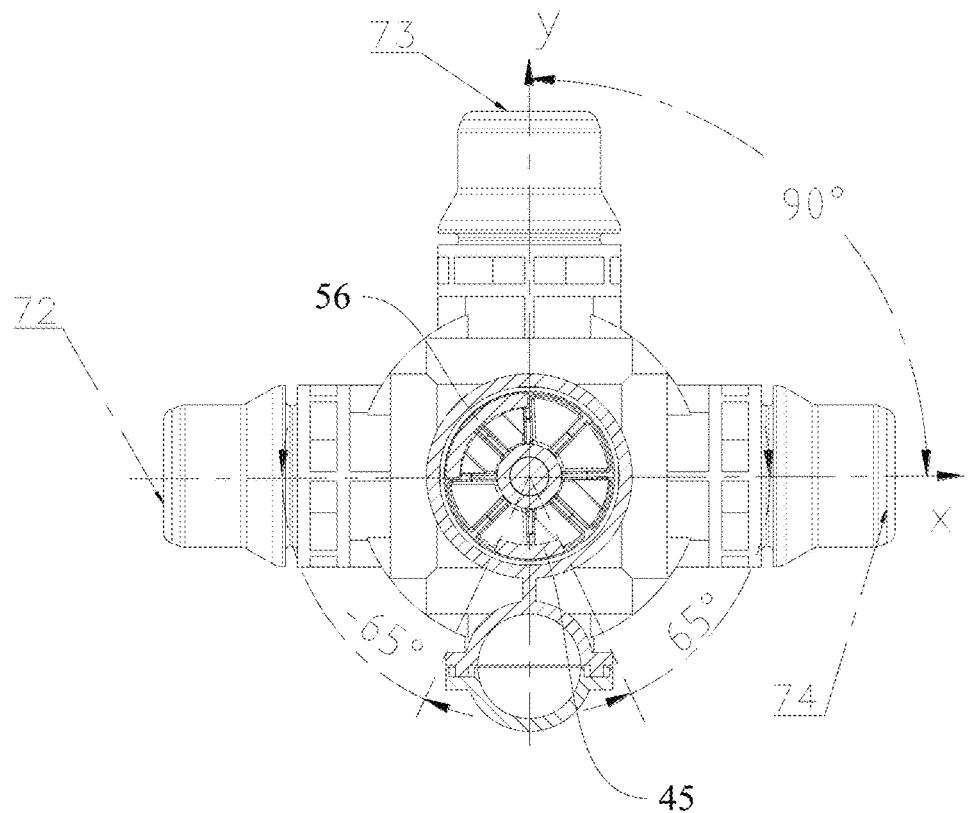
FIG. 27 is a sectional structure diagram of the positional relation between the first transmission part and the second transmission part of the control valve provided in FIG. 24.

As shown in FIG. 27, this embodiment describes the rotational angle-position relation between the first transmission part 45 and the second transmission part 56, the central angle of the first transmission part 45 is 50 degree, and the corresponding central angle of the second transmission part 56 is 90 degree, it is defined that the counterclockwise rotation angle of the valve core is positive, and the clockwise rotation angle is negative, the center line of the fifth pipe orifice 74 is taken as a horizontal reference and as an X axis, the center line of the fourth pipe orifice 73 is taken as a vertical reference and as a Y axis. The first transmission part 45 is located on the Y axis and at the position of 0 degree, and the included angles with the X axis are −65 degree and 65 degree, respectively.

Figure 28:
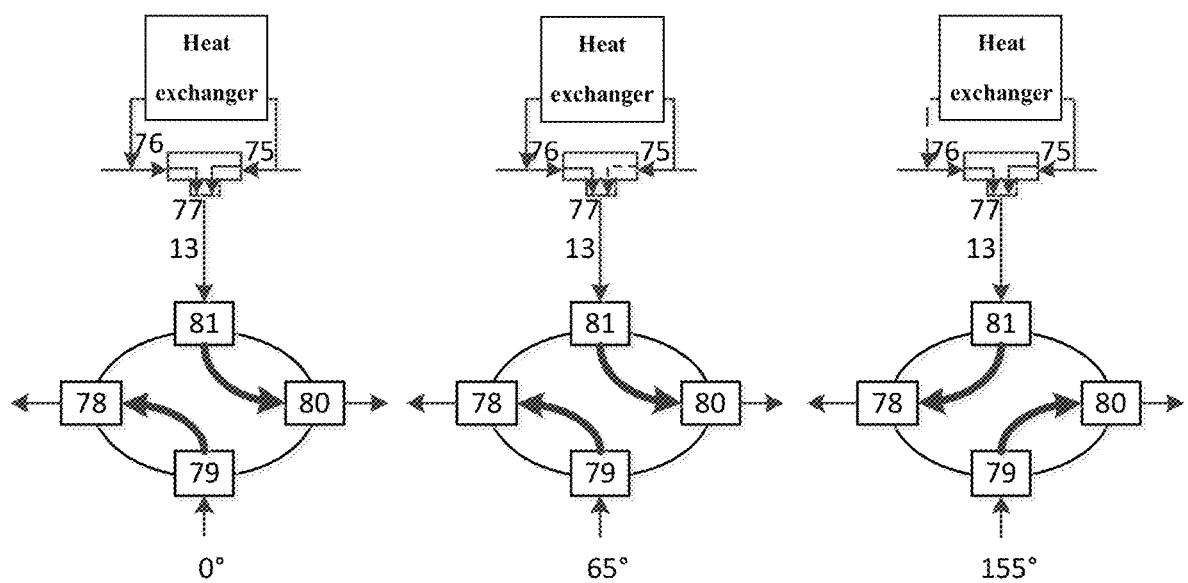
FIG. 28 is a schematic diagram of a flow passage switched position between a valve core rotation angle of 0 degree and 155 degree in the control valve system provided by the third embodiment of the present disclosure.
Figure 29:
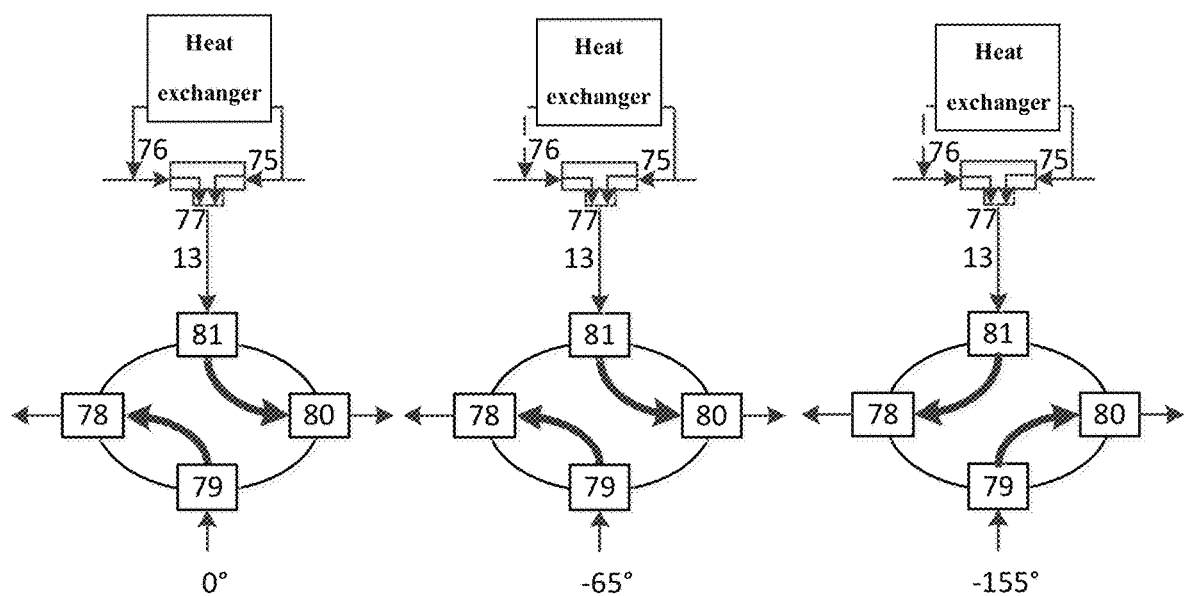
FIG. 29 is a schematic diagram of a flow passage switched position between a valve core rotation angle of −155 degree and 0 degree in the control valve system provided by the third embodiment of the present disclosure.

As shown in FIG. 28 to FIG. 29, the dotted line in the control valve system indicates a dis-communication state, and the solid line indicates a communication state, the first pipe orifice 70, the second pipe orifice 71 and the fourth pipe orifice 73 of the control valve may be inlet pipes, the fluid flows into the valve body from the first port 75, the second port 76 and the fifth port 79; the heat exchanger or a bypass pipeline communicates the first pipe orifice 70 with the second pipe orifice 71, so that the fluid at the first port 75 can flow into the second port 76, in this embodiment, the heat exchanger is taken as an example. The third port 77 is in communication with the seventh port 81 through the connecting pipe 13, and thus the fluid can flow from the third port 77 to the seventh port 81, so that the fluid in the first valve body 201 flows to the second valve body 202. When the driving control part 3 is energized, the relative position between the fluid passage and the inner port of the valve cavity in the first valve core 10 and the second valve core 12 is changed, thereby realizing various valve core combinations and flow passage modes.

In case that the first valve core 10 rotates from 0 degree within the coordinate axis range −65 degree to 65 degree, the first transmission part 45 and the second transmission part 56 are not in contact, and thus the second valve core 12 does not rotate with the first valve core 10, and in that case the flow direction of the fluid in the second valve body 202 does not change. When the rotation angle of the first valve core 10 is at the position of −65 degree, that is, the first valve core 10 rotates clockwise by 65 degree from the position of 0 degree, the second port 76 is blocked by the first valve core 10, and the heat exchanger does not communicate the first port 75 with the second port 76, and in that case the flow direction of fluid in the first valve body 201 is from the first port 75 to the third port 77, and the fluid discharged from the third port 77 flows to the seventh port 81 through the connecting pipe 13, the fluid flow direction in the second valve body 202 is from the fifth port 79 to the fourth port 78 as well as from the seventh port 81 to the sixth port 80. In case that the first valve core 10 is at 0 degree, the heat exchanger communicates the first port 75 with the second port 76, the flow direction of fluid in the first valve body 201 is that the fluid in the first port 75 and the fluid in the second port 76 both flow to the third port 77, and the fluid flows from the first port 75 to the second port 76, the fluid flow direction in the second valve body 202 is from the fifth port 79 to the fourth port 78 as well as from the seventh port 81 to the sixth port 80. In case that the first valve core is at the 65 degree position, that is, the first valve core 10 rotates by 65 degree counterclockwise from the 0 degree position, the first port 75 is blocked by the first valve core 10, the heat exchanger communicates the first port 75 with the second port 76, and in that case the fluid flow direction in the control valve is from the first port 75 to the second port 76 as well as from the second port 76 to the third port 77, and the fluid flow direction in the second valve body 202 is from the fifth port 79 to the fourth port 78, and from the seventh port 81 to the sixth port 80.

In case that the rotation angle of the first valve core 10 is within the range of −65 degree to −155 degree, the first transmission part 45 is in contact with the second transmission part 56, and the first valve core 10 pushes the second valve core 12 to rotate clockwise. In case that the first valve core 10 is at the position of −155 degree, the heat exchanger does not communicate the first port 75 with the second port 76, and the first valve core 10 pushes the second valve core 12 to rotate clockwise, the flow direction of the fluid in the first valve body 201 is from the first port 75 to the third port 77, and the fluid flow direction in the second valve body 202 is from the seventh port 81 to the fourth port 78 as well as from the fifth port 79 to the sixth port 80. In case that the first valve core 10 rotates by 155 degree clockwise from the 0 degree position to push the second valve core 12 to rotate to switch the position, based on this, when the counterclockwise rotation angle of the first valve core 10 is within the range of 65 degree to 155 degree, the first transmission part 45 can be in contact with the second transmission part 56, and the first valve core 10 pushes the second valve core 12 to rotate counterclockwise. In case that the first valve core is at the position of 155 degree, the heat exchanger does not communicate the first port 75 with the second port 76, and the first valve core 10 pushes the second valve core 12 to rotate counterclockwise, and in that case the flow direction of the fluid in the first valve body 201 is that the fluid reaches the third port 77 from the first port 75 and the second port 76 at the same time, and the fluid flow direction in the second valve body 202 is from the seventh port 81 to the fourth port 78 as well as from the fifth port 79 to the sixth port 80. Some of the switched modes of the control valve 1000 are listed schematically above, during the clockwise or counterclockwise rotation of the first valve core 10, the control valve 1000 can be switched in various flow passage modes, which is not repeated here.

The above embodiments are only used to illustrate the present disclosure rather than limit the technical solutions described in the present disclosure. Although the present disclosure is described in detail in this specification with reference to the above embodiments, those of ordinary skill in the art should understand that those skilled in the art may still modify or equivalently replace the present disclosure, and all technical solutions and improvements thereof that do not depart from the spirit and scope of the present disclosure shall be covered within the scope of the claims of the present disclosure.

The invention claimed is:

1. A control valve, comprising a valve body, a valve core and a valve core shaft, wherein the control valve has a valve cavity, the valve body is provided with a plurality of ports, at least part of the valve core is positioned in the valve cavity, wherein the valve core comprises a first valve core and a second valve core, the first valve core and the second valve core are arranged along an axial direction of the control valve, at least part of the first valve core and at least part of the second valve core are located in the valve cavity, the port corresponding to a fluid passage of the valve core can be opened or closed by rotating the valve core, the control valve further comprises a first transmission part and a second transmission part, wherein the first transmission part and the first valve core are integrally formed or in transmission connection, so that the first transmission part can rotate synchronously with the first valve core, the second transmission part and the second valve core are integrally formed or in transmission connection, so that the second transmission part can rotate synchronously with the second valve core, wherein the valve core shaft is in transmission connection with the first valve core, the first transmission part is in contact with the second transmission part within a preset angle range and pushes the second valve core to rotate, and in case of being out the preset angle range, a gap is formed between the first transmission part and the second transmission part.

2. The control valve according to claim 1, wherein a cross section of the first transmission part is a sector ring, a cross section of the second transmission part is a sector ring, the cross section of the first transmission part is a cross section obtained by viewing the first transmission part perpendicular to an axial direction of the control valve, the cross section of the second transmission part is a cross section obtained by viewing the second transmission part perpendicular to the axial direction of the control valve.

3. The control valve according to claim 2, wherein the control valve is provided with a plurality of pipe orifices, which are in communication with the corresponding ports, the first valve core comprises a first top surface part, an opening part and a first bottom surface part, the first top surface part and the first bottom surface part are arranged opposite to each other along the axial direction of the control valve, the opening is located between the first top surface part and the first bottom surface part, the opening part is recessed to the inside of the first valve core to form a fluid passage, the fluid passage is able to be in communication in at least two pipe orifices, the first valve core further comprises a connecting protrusion, the connecting protrusion protrudes from the first bottom surface part in a direction away from the first top surface part;

wherein the second valve core comprises a second top surface part, a plurality of valve core holes and a second bottom surface part, the second top surface part and the second bottom surface part are arranged opposite to each other along the axial direction of the control valve, a plurality of valve core holes are located between the second top surface part and the second bottom surface part, the valve core hole is in communication with the corresponding pipe orifice.

4. The control valve according to claim 3, wherein the first valve core further comprises a third transmission part, at least part of the third transmission part extends from the first top surface part to the first bottom surface part, a first transmission hole is provided at the center of the third transmission part, the valve core shaft extends through the first transmission hole and is matched with the third transmission part.

5. The control valve according to claim 1, wherein the first transmission part and the first valve core are in an integrated structure, the second transmission part and the second valve core are in an integrated structure, wherein the first transmission part is located at one side of the first valve core close to the second valve core, the second transmission part is located at one side of the second valve core close to the first valve core.

6. The control valve according to claim 5, wherein the control valve is provided with a plurality of pipe orifices, which are in communication with the corresponding ports, the first valve core comprises a first top surface part, an opening part and a first bottom surface part, the first top surface part and the first bottom surface part are arranged opposite to each other along the axial direction of the control valve, the opening is located between the first top surface part and the first bottom surface part, the opening part is recessed to the inside of the first valve core to form a fluid passage, the fluid passage is able to be in communication in at least two pipe orifices, the first valve core further comprises a connecting protrusion, the connecting protrusion protrudes from the first bottom surface part in a direction away from the first top surface part;

wherein the second valve core comprises a second top surface part, a plurality of valve core holes and a second bottom surface part, the second top surface part and the second bottom surface part are arranged opposite to each other along the axial direction of the control valve, a plurality of valve core holes are located between the second top surface part and the second bottom surface part, the valve core hole is in communication with the corresponding pipe orifice.

7. The control valve according to claim 6, wherein the first valve core further comprises a third transmission part, at least part of the third transmission part extends from the first top surface part to the first bottom surface part, a first transmission hole is provided at the center of the third transmission part, the valve core shaft extends through the first transmission hole and is matched with the third transmission part.

8. The control valve according to claim 1, wherein the valve core shaft comprises a first shaft section and a second shaft section, at least part of the first shaft section and at least part of the second shaft section are arranged along the axial direction of the control valve, the first shaft section is able to be connected with a driving control part, part of the first shaft section and part of the second shaft section are sleeved with each other, the first transmission part is connected to an outer peripheral side of the first shaft section, and the first transmission part is in position-limited connection with the first valve core, the second transmission part is connected to an outer peripheral side of the second shaft section, and the second transmission part is in transmission connection with the second valve core through the second shaft section, the first transmission part and the second transmission part are both located at a side of the first valve core away from the second valve core.

9. The control valve according to claim 8, wherein the first shaft section and the second shaft section sleeved with each other are in clearance fit, the first valve core comprises a limiting part, the first transmission part comprises a fitting part, the limiting part and the fitting part are in position-limited transmission connection, one of the limiting part and the fitting part has a groove structure, and the other of the limiting part and the fitting part has a convex structure, the second shaft section is in interference fit or fixedly connected with the second valve core;

wherein the first transmission part is fixedly connected with the first shaft section, wherein the second transmission part is fixedly connected with the second shaft section, the second shaft section comprises a first subsection and a second subsection, the first subsection and the second subsection are arranged along the axial direction of the control valve, wherein the first subsection is sleeved on the inner peripheral side of the first valve core and is in clearance fit with the first valve core, at least part of the second subsection is located in the second valve core and is in interference fit or fixed connection with the second valve core.

10. The control valve according to claim 8, wherein the control valve is provided with a plurality of pipe orifices, which are in communication with the corresponding ports, the first valve core comprises a first top surface part, an opening part and a first bottom surface part, the first top surface part and the first bottom surface part are arranged opposite to each other along the axial direction of the control valve, the opening is located between the first top surface part and the first bottom surface part, the opening part is recessed to the inside of the first valve core to form a fluid passage, the fluid passage is able to be in communication in at least two pipe orifices, the first valve core further comprises a connecting protrusion, the connecting protrusion protrudes from the first bottom surface part in a direction away from the first top surface part;

wherein the second valve core comprises a second top surface part, a plurality of valve core holes and a second bottom surface part, the second top surface part and the second bottom surface part are arranged opposite to each other along the axial direction of the control valve, a plurality of valve core holes are located between the second top surface part and the second bottom surface part, the valve core hole is in communication with the corresponding pipe orifice.

11. The control valve according to claim 1, wherein the control valve is provided with a plurality of pipe orifices, which are in communication with the corresponding ports, the first valve core comprises a first top surface part, an opening part and a first bottom surface part, the first top surface part and the first bottom surface part are arranged opposite to each other along the axial direction of the control valve, the opening is located between the first top surface part and the first bottom surface part, the opening part is recessed to the inside of the first valve core to form a fluid passage, the fluid passage is able to be in communication in at least two pipe orifices, the first valve core further comprises a connecting protrusion, the connecting protrusion protrudes from the first bottom surface part in a direction away from the first top surface part;
wherein the second valve core comprises a second top surface part, a plurality of valve core holes and a second bottom surface part, the second top surface part and the second bottom surface part are arranged opposite to each other along the axial direction of the control valve, a plurality of valve core holes are located between the second top surface part and the second bottom surface part, the valve core hole is in communication with the corresponding pipe orifice.

12. The control valve according to claim 11, wherein the first valve core further comprises a third transmission part, at least part of the third transmission part extends from the first top surface part to the first bottom surface part, a first transmission hole is provided at the center of the third transmission part, the valve core shaft extends through the first transmission hole and is matched with the third transmission part.

13. The control valve according to claim 12, wherein the first valve core further comprises a first top wall part, the first top wall part surrounds the first top surface part and protrudes from the first top surface part in the direction away from the first bottom surface part, a plurality of first ribs are arranged between the first top wall part and the third transmission part, the plurality of first ribs protrude from the first top surface part to the direction away from the first bottom surface part, the first ribs extend radially to the third transmission part from the first top wall part, and intersect with the third transmission part.

14. The control valve according to claim 13, wherein the first transmission part is located in the first valve core and is fixedly connected with the first valve core;
wherein the plurality of first ribs are provided with strip-shaped protrusions, the strip-shaped protrusion protrudes from the first rib in a direction away from the first bottom surface part, wherein the control valve further comprises an adapter and a driving control part, the first valve core is positioned between the driving control part and the second valve core, the adapter is connected between the driving control part and the first valve core;
wherein the strip-shaped protrusion abuts against the adapter.

15. The control valve according to claim 12, wherein the first transmission part is located at one side of the first valve core close to the second valve core, the second transmission part is located at one side of the second valve core close to the first valve core, the first transmission part is positioned on the first valve core and fixedly connected with the first valve core, the inner diameter of the connecting protrusion is greater than the outer diameter of the third transmission part, the connecting protrusion protrudes from the first bottom surface part in an axial direction, the connecting protrusion comprises a first inner wall and a first outer wall, the first transmission part is protruded from the connecting protrusion in a direction away from the first top wall part, the first transmission part comprises a first outer side surface, and the first outer side surface partially coincides with the first outer wall;
wherein a projection height H1 of the first transmission part in the axial direction is less than a projection height H2 of the connecting protrusion in the axial direction.

16. The control valve according to claim 12, wherein the first valve core comprises a plurality of second ribs, the plurality of second ribs are positioned between the connecting protrusion and the third transmission part, the plurality of second ribs extend in the radial direction toward the third transmission part from the first inner wall of the connecting protrusion as a starting point, and intersect with the third transmission part.

17. The control valve according to claim 12, wherein the second valve core further comprises a fourth transmission part, at least part of the fourth transmission part extends from the second top surface part to the second bottom surface part, a second transmission hole is provided at the center of the fourth transmission part, at least part of the valve core shaft is located in the second transmission hole and is matched with the fourth transmission part.

18. The control valve according to claim 12, wherein the second valve core further comprises a second top wall part, the second top wall part surrounds the second top surface part and protrudes from the second top surface part in the direction away from the second bottom surface part, a plurality of third ribs are arranged between the second top wall part and the fourth transmission part, the plurality of third ribs protrude from the second top surface part in the direction away from the second bottom surface part, the plurality of third ribs extend radially toward the fourth transmission part from the second top wall part as a starting point, and intersect with the fourth transmission part.

19. The control valve according to claim 18, wherein the first transmission part is located at one side of the first valve core close to the second valve core, the second transmission part is located at one side of the second valve core close to the first valve core, the second transmission part is positioned on the second valve core and fixedly connected with the second valve core, the second transmission part protrudes from the second top surface part to the direction away from the second bottom surface part, the second transmission part comprises a second outer side surface and a second inner side surface, the second outer side surface is abutted to the second top wall, and the second inner side surface is connected with the plurality of third ribs;
wherein the second valve core further comprises a bottom wall part, the bottom wall part surrounds the second bottom surface part and protrudes from the second bottom surface part in the direction away from the second top surface part, a plurality of fourth ribs are arranged between the bottom wall part and the fourth transmission part, the plurality of fourth ribs extend radially toward the fourth transmission part from the bottom wall part as a starting point, and intersect with the fourth transmission part.

20. A control valve system, comprising a connecting piece and the control valve according to claim 1, wherein the control valve is provided with a plurality of pipe orifices, the connecting piece is provided with a communication cavity, the valve body comprises a first valve body and a second valve body, at least part of the first valve core is located in the first valve body, at least part of the second valve core is located in the second valve body;

wherein some of the pipe orifices located in the first valve body are in communication through the communication cavity of the connecting piece, and the connecting piece is at least one of fluid assemblies and a bypass pipeline.

* * * * *